United States Patent

[11] 3,579,105

[72] Inventor Larkin B. Scott
Fort Worth, Tex.
[21] Appl. No. 803,723
[22] Filed Mar. 3, 1969
[45] Patented May 18, 1971
[73] Assignee The Perkin-Elmer Corporation
Norwalk, Conn.

[54] DIGITAL READOUT SYSTEM HAVING AN AUTOMATIC ZERO-SETTING CIRCUIT
18 Claims, 5 Drawing Figs.

[52] U.S. Cl. .................................................. 324/99, 324/130
[51] Int. Cl. ..................................................... G01r 17/06, G01r 1/02
[50] Field of Search .......................................... 324/99, 99 (P), 130, 140; 340/347 (A-D); 356/88, 96, 97; 250/214; 330/9

[56] References Cited
UNITED STATES PATENTS

| | | | |
|---|---|---|---|
| 3,105,230 | 9/1963 | MacIntyre..................... | 340/347 |
| 3,258,764 | 6/1966 | Muniz et al..................... | 324/99X |
| 3,316,547 | 4/1967 | Ammann....................... | 324/99X |

Primary Examiner—Rudolph V. Rolinec
Assistant Examiner—Ernest F. Karlsen
Attorney—Edward R. Hyde, Jr.

ABSTRACT: A digital measuring circuit for determining a desired mathematical relationship between a first variable input signal and a second relatively constant "reference" signal includes in addition to the main or computing mode of operation, a second mode of operation for automatically recalibrating the computing circuit. The automatic recalibration is accomplished by supplying at the first input (where the normally variable signal would be applied) a "blank" input which is "expected" to be equal to the second "reference" input. The automatic recalibration circuit mode then causes a change in the effective amplitude value (as by attenuation, for example) of the "reference" signal, so as to create a balance or calibration between the "blank" first signal and the changed "reference" signal (for example making them equal). A "memory" stores the type of change (e.g., the attenuation factor of the "reference" input) necessary to create this balanced condition, and this stored calibration information is utilized during the normal computing mode so as to automatically calibrate out any systematic and other errors, even if they originate in the remote effective sources of either of the first variable signal or of the second "reference" signal. The circuit is disclosed in an exemplary embodiment particularly adapted to measuring the relative intensities of the "sample" and the "reference" beam intensities of a double-beam absorption spectrophotometer. In this exemplary usage, the computed relationship is the logarithm of the ratio of the reference beam intensity to that of the sample beam intensity, and the automatic calibration is accomplished (in a linear mode) by causing the "reference beam" intensity signal to be made equal to a "blank" first signal representing the intensity of the "sample beam" when no absorbing sample material is actually present in this beam. In such an environment, the computed logarithm of the ratio of the two signals may be obtained directly in "absorbance" units, or by further (manual) calibration of the computing circuit directly in terms of the concentration of the (absorbing component of the) sample material.

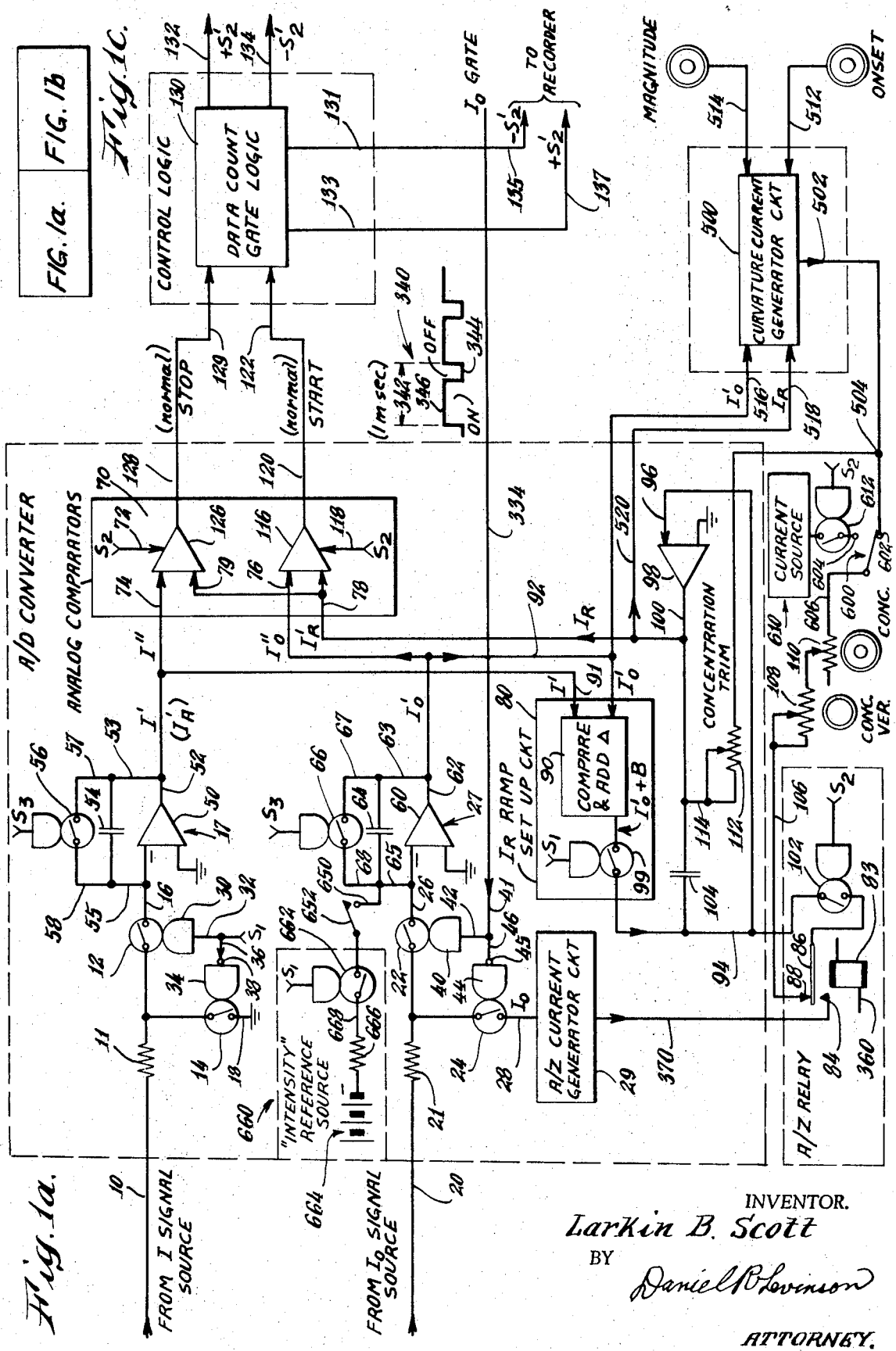

Patented May 18, 1971

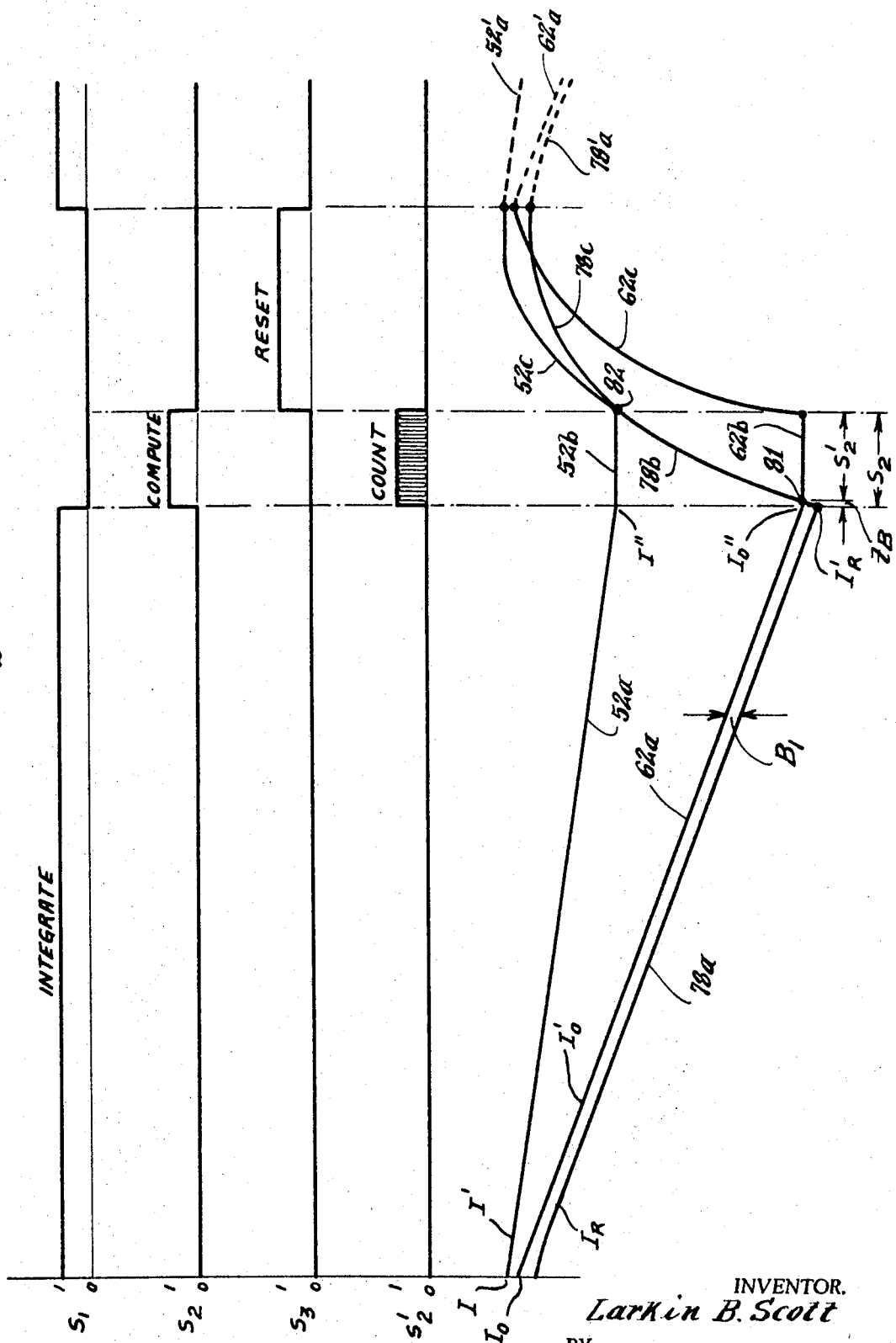

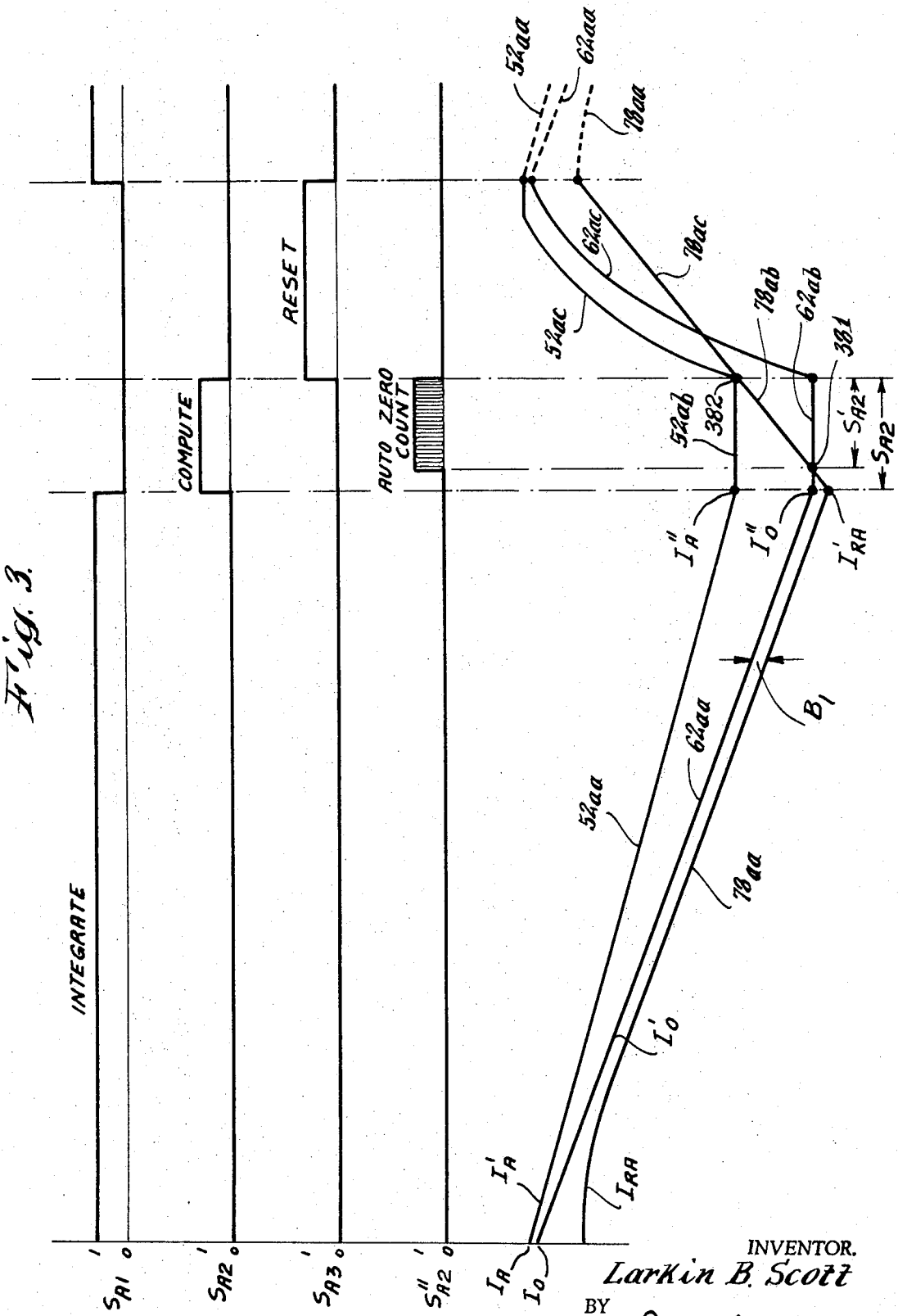

DIGITAL READOUT SYSTEM HAVING AN AUTOMATIC ZERO-SETTING CIRCUIT

This invention relates to digital concentration readout systems of the type which present in digital form an output proportional to the logarithm (to the base 10) of two input signals (say, two different DC voltages). Such computing circuits are referred to as "concentration" readout systems in this context because the concentration of an "unknown" absorbing sample in double-beam spectrophotometers is theoretically proportional to the logarithm of the ratio of the two input signals ($I_0$ and I) which represent the intensities of an originally equally intense "source" radiation beam after it has passed through, respectively, a "reference" path and a "-sample" path (in which the sample is of course located). In particular, the entire circuit involving the present invention performs the same general function (but in a different manner) as the "Digital Concentration Readout System" disclosed and claimed in the joint U.S. Pat. application Ser. No. 515,949 filed Dec. 23, 1965, by the present Applicant and George H. Keats, issued as U.S. Pat. No. 3,467,865 on Sept. 16, 1969 and assigned to the assignee of the instant application.

Although a circuit of the type embodying the present invention may be utilized to form the logarithm ratio of any two input (say, voltage) signals or, with slight modifications, for forming even different functions of two input signals, for purposes of clarity and concreteness of explanation, it will be assumed that the inputs to the digital concentration readout circuit are the rectified DC voltage signals representing the intensities of reference and sample beams ($I_0$ and I, respectively) in an absorption spectrophotometer of the type shown at S in FIG. 1 of said aforementioned copending application. This spectrophotometer S corresponds to the Model 303 Atomic Absorption Spectrophotometer (manufactured and sold by The Perkin-Elmer Corporation, Main Avenue, Norwalk, Conn.). The dashed-lined box indicated by the reference character S in that application includes a schematic of the optics, the detector 22, the detector output amplifier 24 and a signal separator 26 for separating the signal representing the intensity of the transmitted reference beam, $E_0$, and the signal representing the intensity of the transmitted sample beam, E. This same Model 303 Perkin-Elmer Atomic Absorption Spectrophotometer is shown and described somewhat more fully in an article entitled "An Atomic Absorption Spectrophotometer" by Herbert L. Kahn and Walter Slavin in "Applied Optics," Vol. 2, No. 9 (Sept., 1963) at pages 931—936. In particular, FIG. 2 on page 932 of said Kahn and Slavin article shows (in a substantially identical form to that in said copending application) an optical schematic of the instrument including the photomultiplier detector; while FIG. 1 on the same page of said article shows the same elements in block form along the top of the FIG. and a block diagram of the ordinary signal processing electronics of the Model 303 (not including any digital concentration readout circuit) in the lower part of this FIG. 1. As indicated, this article more fully describes the entire instrument, and also shows in more detail some of the specific parts; for example, the signal separator is shown in FIG. 6 on page 935 of the article. Since the circuit of the invention may be utilized for measuring the above-mentioned (or similar) function of two (voltage) signals from other instruments (and in particular other absorption spectrophotometers), the present disclosure does not repeat any of the optical parts or immediate radiation detector and electrical signal separator parts of a spectrophotometer. Rather it is assumed that the input to the circuit of the instant invention has already been put into DC form, after the signal separator (26 in the aforementioned copending application or in FIG. 6 of page 935 of the above-mentioned article), as may best be seen at the sample and reference signals in FIG. 6 of page 935 of said article. Since the reference signal is normally referred to as the $I_0$ signal in spectroscopy and the sample signal is usually referred to as I, this nomenclature rather than the corresponding nomenclature ($E_0$ and E of the aforementioned patent application will be used to represent these same output signals of the signal separator.

The present invention performs, for example, the operation of forming the logarithm of the ratio of $I_0$ (the reference beam intensity) to I (the sample beam intensity), by the technique of effectively reducing the intensity of the larger $I_0$ signal until it matches the to-be-measured I signal so that the ratio of the reduced $I_0$ to the I is unity, and the logarithm of this ratio is therefore zero. In addition, the readout is desired to be both in digital and logarithmic form, so that various types of final digital readout devices (i.e., digital counters, NIXIE tubes, digital data processors, or the like) may receive the output of the circuit directly in concentration-of-the-sample units. By the well-known Lambert-Beer Law, the concentration of the sample varies directly with the logarithm (to the base 10) of the ratio, $I_0/I$, so that this latter quantity is defined as the "absorbance" of the sample. It is therefore desirable to obtain the output of the circuit directly in absorbance units (directly proportional to concentration of the sample in the sample beam). Thus both the aforementioned prior copending application and the present application are directed to the same general purpose of supplying a signal, in digital form, of how many "absorbance units" are required to make the reference and sample intensities respectively equal. However, the present invention utilizes a circuit that is essentially entirely different than that of the copending application.

The present invention provides for automatically resetting the circuit parameters during a period when no sample is in the sample beam so that the intensity of the reference beam (still $I_0$) and the intensity of the sample beam when the sample is absent (say, $I_a$) are equal. Since the absorbance (and of course the "concentration") measured under such conditions should be zero, that is:

$$\log \frac{I_0}{I_a} = 0 = \text{absorbance},$$

should be true since $I_a$ represents the sample beam intensity without any sample therein. In various double-beam instruments, a control (usually a manually operated potentiometer) may be provided so as to adjust the relative attenuation of the $I_0$ and the $I_a$ signal to make them equal prior to introducing the sample at the beginning of analysis. Since this equalizing causes the absorbance to become zero (see the immediately above equation), this (usually operator performed function) is often referred to as "zeroing" the instrument. In a circuit according to the invention, this "zeroing" operation is caused to take place automatically between sample runs. For example a simple pushbutton switch may be provided so that the operator may cause the circuit to automatically adjust itself so as to cause this "zeroing" of the absorbance between samples; in more sophisticated apparatus, e.g., in automatic analyzing systems of the type in which a large plurality of samples may be automatically fed to the analytical instrument (i.e., absorption spectrophotometer), this automatic zero resetting may be "commanded" by the sample feeder in between each (or any number of) sample feeding operations. In other words, the apparatus may reset its own circuit parameters so as to insure that the absorbance measured when a sample is placed in the sample beam is at least substantially free of inequalities between the sample and reference channels, not caused directly by the actual sample.

Accordingly, an object of the present invention is the provision of an improved circuit for supplying in digital form a function (e.g., the logarithm of the ratio) of two electrical inputs in a precise manner.

A more specific object of the invention is the provision of such a circuit in which the circuit will automatically balance its own output (e.g., readjust the logarithm function to zero) upon command when the two input signals are considered equal, so as to cause an "automatic balance" (or "automatic zero reset") calibration.

Further objects, advantages and features of the invention will be obvious from the following detailed description of a single embodiment of a complete circuit incorporating the invention, which description is given in conjunction with the following drawings, in which:

FIG. 1a and FIG. 1b are partially schematic, partially diagrammatic illustrations of a preferred exemplary embodiment of an entire circuit according to the invention, which circuit is capable of performing both the desired computation and automatic recalibration;

FIG. 1c is a block diagram illustrating the manner in which the two parts of the circuit shown in FIGS. 1a and 1b respectively are interconnected;

FIG. 2 is a graphical representation of how the circuit performs a computing mode so as to obtain a digital signal at least proportional to the logarithm of the ratio of its two inputs ($I_0$ and I); and FIG. 3 is a similar graphical representation of how the circuit performs an "automatic zero" recalibration by obtaining a signal equal to the proportional difference between its two inputs ($I_0$ and $I_A$) when the two inputs are to be "considered" equal (e.g., no sample present in the sample beam of a double-beam spectrophotometer).

GENERAL DESCRIPTION OF EXEMPLARY CIRCUIT

Figure 1B:
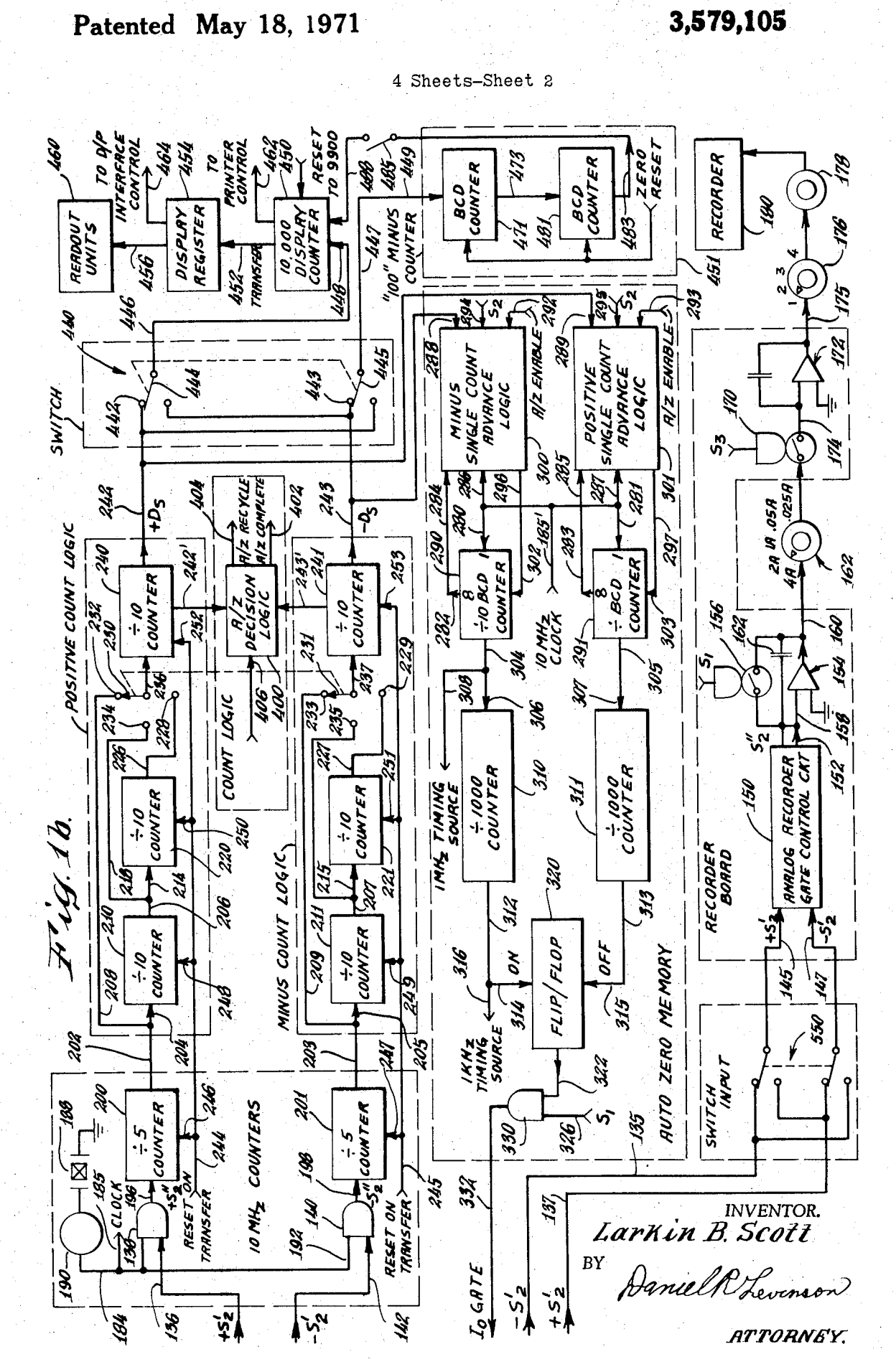

Before describing the more specialized parts, features and operations of the circuit, a general description of the normal computing operation for forming a digital readout proportional to the logarithm (to the base 10) of the ratio of $I_0$ to I, where $I_0$ is the reference signal (for example, the intensity of a reference beam of a double-beam absorption spectrophotometer) and I is the unknown (DC voltage) signal (for example, the intensity of the sample beam after it has passed through a sample of unknown concentration). For purposes of explaining this general operation, reference will be made to the somewhat simplified schematic diagram of both parts of FIG. 1 of the whole circuit and the schematic of FIG. 2 showing the timing and approximate waveforms utilized in the three stages of a single operating cycle during normal computation. As indicated in FIG. 1, the unknown DC input I is continuously supplied at 10 through a resistor 11 to the input sides of a pair of electronic switches 12 and 14 respectively. Each of these switches are shown in its "normally" off (i.e., open) condition. The output contact of switch 12 is connected to the input at 16 of an integrating circuit shown generally at 17. The output of switch 14 at 18 is connected to ground, 19. The (larger) DC reference voltage $I_0$ (representing, for example, the reference beam intensity of the double-beam absorption spectrophotometer) is continuously present at the input lead 20, so as to reach the input sides of electronic switches 22 and 24 after passing through resistor 21. The output of switch 22 is connected by lead 26 to the input of a second integrating circuit 27. The output lead 28 of switch 24 is not grounded (as is the equivalent output of switch 14) but rather is supplied to an automatic zero current generator circuit 29.

An operating cycle control logic (not shown in FIG. 1) supplies during the first stage of a normal computing cycle of the circuit (see FIG. 2) a first "integrate" signal $S_1$ during the time it is intended to pass the DC input voltages I, $I_0$ to the integrators 17 and 27 respectively. In particular, $S_1$ is presented to the control element 30 of switch 12 as indicated at 32, so as to cause closing of the switch, thereby connecting voltage I to the input of integrator 17. During the remaining stages of the cycle (i.e., when the integrate signal $S_1$ is not present), control element 34 of switch 14 will cause grounding of the input voltage I, since element 34 operates in the absence of a signal at its input 36 as indicated by the conventional negating symbol 38. In a similar manner, during the first integrating stage ($S_1$) of the normal computing mode of operation, an $I_0$ GATE signal will be present at 41 and therefore at input 42 of control element 40, so as to simultaneously close switch 22 so as to present the signal $I_0$ to the input of the second integrator 27. When the $I_0$ GATE signal is present on leads 41 and therefore at input 46 to the negative (as indicated at 45) control element 44, switch 24 remains open; switch 24 closes in an analogous manner to switch 14 at the end of integrating period ($S_1$) so as to connect input signal $I_0$ to circuit 29 for a purpose which will be explained hereinafter.

Each of the integrators 17, 27 may comprise a high gain (e.g., operational) amplifier 50, 60 respectively, having essentially pure capacitive feedback. Specifically, the outputs of these amplifiers at 52, 62 respectively are connected to a feedback loop comprising output feedback lead 53, capacitor 54 and input feedback lead 55 for amplifier 17, and the same elements at 62, 63, 64 and 65 for amplifier 27. A normally disconnected shunting path across the two capacitors 54, 64 is provided for discharging or resetting the capacitors at the end of a normal computing cycle, that is, when the third reset control signal $S_3$ is provided (compare FIG. 2) so as to cause the normally open electronic switches 56, 66 to close and therefore provide a substantially short circuit discharge of the two capacitors through leads 57 and 58 and 67 and 68, respectively. Since the electronic switches may be field effect transistors, having finite (say 500 ohms) resistance even when closed, the discharge of these capacitors progresses rapidly but at a finite rate as indicated at 52c and 62c in FIG. 2.

During the existence of the integrate signal $S_1$, each of the feedback capacitors 54 and 56 will be charged so as to cause the voltage output (at 52, 62 respectively) of the integrating circuits to assume voltages (shown as negative in FIG. 2) which are linearly proportional to the DC voltage applied to their inputs at 16, 26 respectively (i.e., linearly proportional to the original inputs I and $I_0$). These integrated output voltages are labeled I' and $I_0'$ respectively at the outputs 52, 62 in FIG. 1, and the manner in which they linearly change during the $S_1$ stage is graphically illustrated (at 52a and 62a respectively) in FIG. 2. Since the original input $I_0$ is a larger DC voltage than the original DC input voltage I, under all normal circumstances, the corresponding output voltage $I'_0$ at integrator 27 (as shown in FIG. 2) will change (since negative in this case, decrease) at a faster rate than will the corresponding integrated output I'. When the conventional operating cycle control (or timing) logic ceases to supply the first integrate signal $S_1$ (which has a duration of 100 milliseconds, for example), the inputs (at 16, 26) to the integrators 17, 27 will be simultaneously opened, so as to disconnect the original DC input voltage I and $I_0$ respectively therefrom. As previously noted, these original inputs I, $I_0$ will be grounded and fed to circuit 29, respectively during the remaining stages of a normal computing cycle. The outputs at 52,62 of the integrators will then maintain the value reached (indicated at I'' and $I_0''$ respectively in FIG. 2) of the voltage across the respective capacitance 54 and 64, during the second or count stage, controlled by the second "compute" signal $S_2$. Since these voltages are held at this constant level indicated by horizontal lines 52b and 62b in FIG. 2, and since the analog comparators and digital interface circuit 70 is only actuated when the operating cycle control logic supplies the second "compute" signal $S_2$ as indicated at its control inputs 72, 118, the two comparator inputs 74 and 76 are effectively utilized only when the integrated output signals I' and $I_0'$ are being held at this constant value I'' and $I_0''$ respectively; for this reason the upper two inputs to circuit 70 are indicated as receiving these constant integrated values (although they will of course normally receive but not operate upon the linearly changing values I' and $I_0'$).

The general purpose of the analog comparators and digital interface circuit 70 is to compare (individually) the "held" value of I'' at input 74 and the "held" value of $I_0''$ at 76 with a changing ramp voltage, and to determine when this changing ramp voltage ($I_R$ at input 78) crosses (i.e., becomes equal to) each of the individual "held" values of I'' and $I_0''$ respectively. In general, $I_R$ during the "integrate period" ($S_1$ in FIG. 2) will be caused to assume a value more negative than that of the larger (almost invariably $I'_0$) of the two integrated signals I' and $I_0'$. During the compute or count part of the cycle $S_2$ the $I_R$ value reached at the bottom of the straight line integrate period signal $78_a$ will start to discharge from its maximum (negative) value $I_R'$. In particular, during a normal operating cycle (i.e., one involving actual sample intensity computation), it will be caused to discharge or decay toward ground zero in an exponential manner (as by a capacitor discharging through a resistance). Then, the time between this exponentially decaying voltage $78b$ crossing the constant (more negative) voltage at $62b$ (directly proportional to the original $I_0$) at point 81, and the time that this exponentially decaying voltage along $78b$ crosses the constant voltage $52b$ (proportional to the sample signal I) at point 82 will be proportional to the logarithm of the ratio of $I_0$ divided by I. This time is therefore directly proportional to the desired logarithm of the ratio of the inputs (e.g., the concentration or absorbance of a sample in a double-beam absorption spectrophotometer). The time itself could be used as an analog signal (and in fact is so utilized in one form of output, as to a conventional chart recorder) to give a readout directly of the measured logarithm of the ratio of the two input signals (e.g., concentration, or absorbance). However, this time is also converted into digital form, broadly by allowing this time as determined by the analog comparators and digital interface circuit 70 to be used to gate a constant pulse supplier so as to digitize the length of this time in the form of a directly proportional number of passed pulses. Not only is this form of output more conveniently utilized to drive such readouts as NIXIE tubes, various other types of counter displays, and for further processing and/or storage in data processing apparatus, but as will appear hereinafter the digital output is utilized in a sort of memory and feedback loop to perform the "automatic zero reset" function when the two original input DC voltages I and $I'_0$ are supposed to be equal, e.g., in an absorption spectrophotometer when a "blank" or no sample is present in the sampling beam so that I (the sample beam intensity) and $I_0$ (the reference beam intensity) in this use should be equal.

Before describing the rest of the entire circuit and its components, it is pointed out that the general technique utilized to cause this automatic zero reset is determination of how the nominally identical "blank" sample signal I and the reference signal $I_0$ differ (during an automatic zero-reset cycling, not a normal one), and then to adjust the gating of the $I_0$ signal by means of the electronic switch 22 (typically a field effect transistor) so that it is not on continuously during the integrate period $S_1$ but rather acts as a chopper having an off proportion of its duty cycle such as to cause attenuation of the $I_0$ signal prior to its entry into the $I_0$ integrating circuit 60. Thus, as may be seen, the input lead 41 to the inputs of the electronic switches or field effect transistors 22, 24 is not merely the constant $S_1$ signal but rather is an "$I_0$ GATE" signal, which although existing only during the $S_1$ signal period has a duty cycle generally less than 100 percent, so that electronic switch 22 is not continuously closed during the $S_1$ period (as is in fact true of the corresponding electronic switch 12 in the I integrator input).

A major feature of the circuit is its ability by a simple command to set the duty cycle of the electronic switch 22 to the correct value (equal to or less than 100 percent) to eliminate errors caused by undesired effects on the I and $I_0$ signals; since in normal use the $I_0$ signal is substantially larger than a true "-sample " I signal, a substantial amount of correction is available since the duty cycle of electronic switch 22 may be decreased substantially below 100 percent; in operation the automatic zero-reset cycle is first performed so as to determine what correction should be made (during a "blank" sample signal run), and this correction is "remembered" and applied to decrease the duty cycle of the electronic switch or chopper 22 by whatever percentage is necessary to eliminate this systematic error when subsequent actual computing cycles (i.e., "real" sample signals) I are being computed.

Since the broad technique of forming the automatic zero reset has already been described, some attempt will be made in the description of the rest of the circuit to at least mention their function during the automatic reset cycle (which operation will be more fully described after all of the components have been described first). Thus the circuit 29 previously referred to is utilized only during the automatic zero reset mode of operation to supply an input to a ramp generator circuit, shown generally at 80. More particularly when relay 83 is energized circuit 29 will be connected to the input of this ramp generator circuit by causing switch 86 to move from its normal position (as shown) to contact 84 during such automatic zero reset operation. The normal position of switch 86 is however as shown so as to connect with the upper contact 88 during normal computing operating cycles (i.e., when a real sample signal I is being processed). The primary or signal inputs to the ramp generator circuit 80 during the first "integrate" stage of the normal operating cycle are merely the $I'$ and $I'_0$ signals fed by leads 91 and 92 respectively as the inputs of a comparison circuit 90. The output of circuit 90 will be the larger of the two input signals (almost invariably $I'_0$) plus an incremental or bias additional voltage (supplied by any conventional biasing type circuit), B. Because of the presence of this small incremental biasing voltage B the input 96 to the operational amplifier 98 of the ramp generator will be fed a voltage somewhat greater than being fed to either of the inputs 16, 26 of the operational amplifiers 50, 60 of the signal integrators, during the first "integrate" stage of each computing operating cycle (i.e., when signal $S_1$ closes electronic switch 99). For this reason, the (negative) integrated output $I_R$ at 100 will always be somewhat greater (i.e., more negative) by an amount, indicated at $B_1$ in FIG. 2, than the greater of the integrated signals ($I'$ or $I'_0$), assumed to be $I'_0$. Thus the $I_R$ voltage output will be parallel to but somewhat more negative, during the $S_1$ stage (as indicated at $78a$) than the greater of the integrated signals (as previously noted, it will be assumed throughout the description that $I'_0$ is the greater one as will be the case in absorption spectrophotometers; the circuit as illustrated however can actually cause correct operation even if the converse is true, but this situation will not normally be described in order to avoid repetition). At the end of the fixed integrating period determined by the fixed signal $S_1$ (say, 100 milliseconds), the output of the ramp generator 80 at 100 will therefore have a voltage value equal to $I'_R$ of FIG. 2. For this reason, the input at 78 and the continuation at 79 of this input to the analog comparators 70 are labeled $I'_R$ since this is their value at the beginning of the second (compute or count) stage represented by the signal $S_2$.

At the end of stage one and the beginning of stage two, not only will the input switch 99 of the ramp generator 80 open, but the feedback switch 102 will close (in view of the presence of signal $S_2$ as indicated). Therefore, the capacitor 104 of the ramp generator will start to discharge from its initial maximum value of $I'_R$ through lead 94, switch 102, switch 86, lead 106, the various adjustable resistors and potentiometers 108, 110 and 112 and lead 114, so as to cause the output at 100 to exponentially "decay" toward ground (i.e., become less negative) according to an exponential curve determined by the effective resistance value of elements 108, 110, and 112. Since the original voltage value $I'_R$ (see FIG. 2) is not much larger than $I''_0$, the exponentially decaying voltage curve $78b$ will cross straight line $62b$ at point 81 relatively soon after the onset of the second compute stage ($S_2$). This crossing is detected by the differential amplifier 116 which is comparing these two signals at its inputs 76 and 78. As may be seen at 118, the differential amplifier 116 has a control input so that this comparison is made only during the second or computing stage, $S_2$. Upon the two inputs becoming equal, the output 120 of this differential amplifier will provide a signal which will set or "start" the data count gate logic 130 at its "start" input 122. When the exponentially decaying ramp voltage (see curve $78b$ in FIG. 2) which is being supplied at input 79 to the other differential amplifier or comparator 126 is "seen" to be equal to (or less negative than) the voltage $I''$ (straight line at $52b$ in FIG. 2) closing its other input 74, a reset or normal "-stop" signal will appear at its output 128. This of course occurs at point 82 in FIG. 2 and causes the end of the "count"

stage of the cycle. It may be noted from FIG. 2 that the time between when the exponentially decaying ramp generator output voltage $I_R$ along curve 78b crosses first the $I''_0$ and then the $I''$ (62b and 52b at points 81 and 82, respectively) levels will be equal to the entire compute stage $S_2$ minus the small amount of time, $t_B$, required for the ramp voltage to decay from its maximum negative value $I'_R$ to point 81. Thus the actual time between these crossings, indicated at $S'_2$ in both FIGS. 1 and FIG. 2 is slightly less than the entire compute stage, $S_2$ by this small time, $t_B$. It is the times between actual crossings (i.e., the abscissa difference between points 81 and 82) at $S'_2$ that is directly proportional to the logarithm of the ratio of $I''_0$ divided $I''$ (or the proportional original inputs $I_0$ and $I$, respectively). Thus it is this time $S'_2$ between the crossings of the curves at points 81 and 82 that is the significant measured time. Accordingly, the data count gate logic upper output 132 will carry a signal during the now computed interval $S'_2$ directly proportional to the desired logarithmic ratio. The lower output 134 of this data count logic would contain a similar signal (analogous to $S'_2$) if the sample signal, say $I''$, were larger (i.e., more negative) or FIG. 2 than the "reference" signal, e.g., $I''_0$. In this case the input at 129 (the "normal" stop input) would in fact occur prior to the input at the lower input 122 (the "normal start" input). The primary difference would be to reverse the "normal" opening and closing of the data count gate so as to cause the desired signal to appear at its lower output 134. As indicated in FIG. 1b, the upper output of the data count gate is considered the positive count gate signal (the one expected of course in the exemplary use mentioned, namely absorption type spectrophotometers), and is supplied as an input 136 to the upper or "positive" AND gate 138. If the original signals ($I$ and $I_0$) were such that $I$ were larger than $I_0$ then the output occuring instead at 134 would cause an actuate input of the lower or "minus" count AND gate 140 as at 142 for the correct duration of time (representative of minus the logarithm of the ratio of $I_0/I$ (or what is the same thing, the logarithm of the ratio of $I/I_0$).

Since it is the "length" (i.e., time span) of the now computed signal $S'_2$ which is proportional to the desired logarithm of the ratio of the original inputs (and therefore the absorbance and thus the concentration of a sample in a double-beam spectrophotometer, for example), this same signal may be utilized, as an output 131 and 133 respectively (corresponding exactly, for example to outputs 132 and 134) to drive an analog-type recorder. Before explaining the more important digital parts of the circuits at the upper part of FIG. 1 and in particular the technique for forming the automatic zero reset involving the elements primarily in the middle right-hand part of FIG. 1, the straight forward manner in which the computed "length" signal $S'_2$ may be used to run an analog display device (for example, a chart-type recorder) will first be explained.

The likely to occur "positive" output at 131 is introduced by lead 135 as an input 145 to the analog recorder gate control circuit 150. The unlikely to occur "minus" computed signal $S'_2$ similarly lead over 137 to input 147 of circuit 150.

Since input leads 145 or in rare cases 147 contain a signal the length of which is directly proportional to the desired logarithm of the ratio (e.g., absorbance or concentration), it is relatively simple to utilize this basically analog-type signal to run an analog chart recorder. Thus circuit 150 merely must provide at its output a DC voltage having either a duration or an intensity proportional to the length of the computed signal $S'_2$. One technique for driving such an analog (e.g., chart) recorder is, as shown, to cause this output (proportional and of the correct sign relative to the input) at 152, designated $S''_2$ to be integrated (i.e., converted into a signal which has a total value directly proportional to its intensity and in particular its duration). Since the signal is available only during the original $S_2$ count cycle, the integrator 154 is disabled as by electronic switch 156 shorting the input thereof 158 to the output 160. At the end of the $S_1$ period switch 156 will open and the signal $S''_2$ will charge the negative feedback capacitance 162 to a value proportional to the length of time of the computed "absorbance" signal $S''_2$. At the end of the normal computing cycle $S_2$, the electronic switch 170 will close allowing the integrated signal at 160 to pass to the input 174 of the final recorder amplifier 172. The output of this amplifier at 175 will then be suitable to drive the recorder (i.e., the pen of a chart recorder) directly. As indicated at 162, a "scale expansion" potentiometer may be provided so as to attenuate this signal by various factors so as to cause the full scale of the recorder to correspond to different logarithm-of-the-ratio of the original-input values (indicated as the maximum number of full absorbance units that will cause 100 percent pen travel of a chart recorder, for example). At 176 is indicated a switch for allowing one of four different time constants to be introduced between the final amplifier and the actual chart recorder, as is commonly provided in such circuits, so that the operator may choose a different pen response time to avoid undue lag or jumping of the pen depending on the magnitude of the signals. Finally at 178 is indicated a "fine" recorder zero adjust to compensate for drift in the recorder or the immediate recorder elements (i.e., 150—180). It should be noted that this recorder zero control 178 is not intended to make any "real" corrections in the data initially fed at 145, 147 to this circuit, since the automatic zero reset mechanism has fully corrected such data for any "drift" in not only all of the other electronics but even more important in certain uses, for the sources of the signals themselves (e.g. in any of the various parts of the double-beam absorption spectrophotometer itself). Since the actual readout to the chart recorder occurs only during the periods $S_3$, the pen movement (assumed to be the ordinate of the chart recorder) is in a stepwise manner while the abscissa is changing continuously. However each of the update recording steps will occur at a rate just over one-tenth of a second and the chart recording will normally appear as a completely smooth curve if the abscissa value is chosen appropriately.

Returning now to the main or digital portion of the readout of the apparatus, it will be seen that the upper inputs 186 and 192, respectively, of the "positive" AND gate 138 and the "-minus" AND gate 140 are supplied from the output 184 of a crystal 188 controlled 10 megahertz (10MHz.) oscillator 190. A branch lead 185 from this oscillator also provides a 10 MHz. clock pulse train, the use for which will be subsequently explained. Assuming that the $I_0$ intensity signal is greater than the $I$ signal, the computed $S'_2$ signal will appear at the upper output 132 of the circuit 130 and therefore will actuate the positive AND gate 138 for a period of time determined by the length of this computed signal $S'_2$. The positive AND gate 138 will therefore have at its output 196 a series of 10 megahertz (or 10 megacycles per second) pulses the total duration or number of which will be directly proportional to the length of the computed signal $S'_2$. These 10 megahertz pulses therefore continue (i.e., have a count) directly proportional to the computed (logarithm of the ratio of the original inputs) signal $S'_2$ and the signal is therefore indicated as $S''_2$ at 196. These pulses are fed to a "five" recycling counter or divider 200. Accordingly the output 202 of this counter will have one-fifth as many pulses (at a 2 MHz. cycle rate of course) as did the original input at 196 of $S''_2$. This 2 MHz. signal (the number of pulses of which is still proportional to the computed desired logarithmic function) is then fed to a series of two divide-by-10 recycling counters 210 and 220 respectively. Thus the output at 202 is fed directly as the input 204 to the first of these divide-by-10 counters 210, the output of which at 206 (a series of 200 kHz. pulses) will of course be one-tenth in number to the input. This output at 206 is fed as an input 214 to the next divide-by-10 recycling counter 220, which therefore has its output 226 one-tenth as many pulses (at a 20 kHz. rate). This output at 226 forms one of the inputs at 228 to a manually operatable ganged three-positioned switch 230.

In addition to the straight through series connections already described which provide a division by 100 of the counts appearing at 202 (and therefore by 500 of the original counts appearing at 196), there are provided bypass leads between each of counters 200 and 210 and between 210 and 220. Thus the first bypass lead 208 will take the 2 MHz. signal directly to the uppermost contact 232 of switch 230, indicated as the CAL (for calibrate) contact which yields the greatest number of counts to allow the finest readout in digital form of the signal $S''_2$. The bypassing or shunting lead 218 between counters 210 and 220 is connected to the second input 234 of switch 230 so as to provide a one-tenth as "fine" (consisting of one-tenth as many pulses) signal representative of the same computed logarithmic signal $S''_2$. Obviously the final lowestmost input 228 of this three-position switch receives, as noted before, the slowest 20 kHz. pulse rate and therefore the least "fine" digital signal representing the same computed data.

The number of pulses that will appear at the output 236 of switch 230 will be one-tenth or one one-hundredth of the "correct" digital number representing the actual value of the computed $S'_2$ signal when the switch is connected to contact 234 or 228, respectively. When the switch is connected, for example, to the 234 contact, the circuit will perform 10 complete computations (each lasting about 120 milliseconds) and will supply the total counts obtained through these 10 computations to lead 236. In other words, each of the 10 (theoretically same measurements except for random noise) will be weighted one-tenth of their value and serially added so as to give an average of 10 computations. Such a capability is, as is well understood in the art, advantageous to improve the signal-to-noise ratio of "noisy" signals since the noise is partially averaged out without any loss in the signal strength. Obviously when switch 230 is moved to the 100-divide input 228, the same type of effect will be obtained by running a series of 100 computations and adding a 100th fraction of each to all of the others so as to provide an average value of these 100 computation operating cycle "runs."

The output at 236 of the switch (regardless of its position) is then fed to a further dividing by 10 counter 240, which will therefore have at its output 242 the same number of pulses, regardless of whether a single run, an average-10 type operation, or an average-100 type operation was performed. This is so since it will have at its output either a "burst" of 200 kHz. pulses for a timed duration equal to one-fifth (because of counter 200) of the original computed signal $S''_2$ when the switch 230 is in the fastest or calibrate position (i.e., input 232); alternatively it will have a series of 10 such bursts (i.e., each of the same duration as before) but at a 20 kHz. rate, which is obviously therefore the same number of pulses; similarly when the switch is in the 100 averaging mode (contact 228) signals will leave output 242 at only a 2 kHz. rate, but there will be a series of 100 "bursts" or trains of such pulses (each burst still of course being of the same length as before). Thus regardless of the position of switch 230, the output at 242 will contain exactly one-fiftieth as many pulses as were originally present at input 196 during the entire computing operation (whether one run, a 10-average run, or a 100-average run has been made).

Output 242 thus is the main digital output, representing in digital form $D_s$, which contains a number of pulses directly proportional to the "length" of the computed analog signal $S''_2$ which in turn is directly proportional to the desired logarithm of the ratio of $I_0$ to I.

A previously pointed out, if the input signals, and therefore their integrated values $I''$ and $I''_0$ are not (as expected) such that the $I_0$ is the larger, then as previously stated it will be the lower output 134 of the data count gate logic 130 that contains a signal proportional to the logarithm of the ratio of the two signals. Therefore it will be the "minus" AND gate 140 that will receive the signal at 142 so as to provide at its output 198 a signal (labeled minus $S''_2$) which is exactly analogous to the signal at the positive AND gate 138 output at 196 already described. The only difference is that this signal will represent the minus logarithm of the same ratio of inputs as previously described, which may be alternatively thought of as the logarithm of the inverse ratio of the two original input signals (i.e., I divided by $I_0$). Since the structure and function of the "minus" count logic is exactly the same as that of the previously described "positive" count logic (i.e., elements 200—242), none of this structure or the exactly same functioning will be redescribed. Rather the elements numbered exactly one higher (i.e., odd numbers), starting at the divide-by-five cycling counter 201 and ending with the final output 243 (indicated also as "minus $D_s$") correspond exactly in both structure and function to the even-numbered elements just described which are numbered one lower. Thus elements 201—243 are not described, since such description would be a complete repetition of exactly the same description of elements 200—242. Thus it is merely mentioned that output 243 will contain in exactly the same manner as previously described for the even numbered "positive" circuits (at output 242), a digital signal having a number of pulses directly proportional to minus the logarithm of $I_0$ divided by I, when I is larger than $I_0$; stated in different terms, the signal at "minus" output 243 will contain the number of pulses directly proportional to the logarithm of $I_0$ divided by I. Since outputs 242 and 243 are the normal digital outputs used and since, being in digital form, they may be supplied to any type of conventional digital readout units, it should be noted that any particular readout described in the exemplary embodiment is intended purely for purposes of illustration. One such ultimate readout that is particularly convenient in some applications include NIXIE tubes (which of course are really decimal systems rather than binary code devices), any type of binary or decimal printer, or any type of data processor. Since the type of readout chosen forms no part of the present invention, the description of an illustrative readout is postponed. In general, the digital output at 242 or 243 will fed to some display counter, register or the like to "record" at least temporarily the results of the computation. It should be noted that after this transfer to a display, register, recorder, data processor or the like of the computation has occurred, all of the various counters (200, 210, 220, 240 and the odd numbered elements, one higher) would be reset to zero for the next computation. It is emphasized that such resetting and such "next computation" in this case refers to the completion of an entire computation operation which may involve, as already noted, a single computing cycle, the averaging of ten such computing cycles in series, or the averaging of 100 such individual computing cycles, FIG. 2 graphically illustrating only one such individual computing cycle as a normal "operating" cycle. in any event, upon the completion of the 1, 10, or 100 operating cycles, a "reset on transfer" signal, abbreviated R, will be provided at both 244 and 245 so as to reset each of these "positive" and "minus" dividing counters, as indicated by the various resetting inputs 246, 248, 250 and 252 in the "positive" counter chain and the corresponding one-higher numbered resetting inputs in the "minus" counter chain.

AUTOMATIC "ZERO" SETTING

The circuit as so far described is capable of providing both the major or digital output (usually at 242 but possibly at 243) and even a secondary analog output (usually at 131, but possibly at 133). The remaining parts of the circuit perform a function as described in the early part of the instant specification, of automatically calibrating the computing circuit by presenting thereto two inputs at 10, 20 which are intended to be considered equal; and adjusting the circuit so that it "remembers" how much it should from then on attenuate all signals at one input (i.e., 20) to maintain this same state of calibration in subsequent computing cycles. The reason that the "calibration" signal supplied at inputs 10 and 20 are referred to as "considered to be equal" rather than actually equal is that one of the primary purposes of this automatic zero set is to eliminate real inequalities in these signals which are intended to be systematically removed. For example, in an automatic absorption spectrophotometer readout, where I represents a DC voltage representing the electrical signal of a radiation detector (after some initial separation and making it smooth DC) when there is no sample in the "sample beam" of the instrument and $I_0$ represents the same type of DC signal for the "reference beam" intensity, in general the signals are not in fact equal. In particular, not only will inequalities, including for example "drift" in the radiation detector and its immediate (which may be conventional) separating and DC voltage converting circuits affect the values of I and $I_0$ at 10 and 20 in possibly different manners, but the spectrophotometer itself may cause even the actual intensity of the radiation (intended to be equal under these circumstances) to be unequal. Thus it is desirable to remove what may be "real" as well as, say, detector and detector circuit caused inequalities in I and $I_0$ and to remember during a computation when a sample is present, how to again remove these inequalities that are not caused by the intended absorption of the sample to be measured. As previously stated, the circuit of the present invention is of course useful in many applications outside of double-beam absorption spectroscopy, but for convenience it has been and will be continued to be explained in such terms solely for the purposes of concreteness of explanation.

The two series of elements near the horizontal center of FIG. 1b form the automatic zero set memory and will be explained first, since they operate during the normal computing cycles as well (being set during the automatic zero set cycle). Starting at an input 185', the 10 MHz. CLOCK pulses are provided (this merely being a continuation of lead 185 from the oscillator 190 previously described) to two series of dividing counters, at least the first stage of which is capable of operating at this high pulse rate. In particular, the 10 MHz. CLOCK pulse input will be fed to the input at 280 of high speed binary code decimal (recycling) counter 290. Such (integrated circuit type) counters are commercially available, for example under part number 7490 from the Texas Instrument Company. However, they require a substantial part of the entire 100 nanoseconds (e.g., about 50 nanoseconds) to count from seven (i.e., the 1, 2 and 4 bit inputs "on" and the eight bit "off") to 8 (clearing of the 1, 2, 4 bit input-outputs and setting of the 8-bit input and output) to "on". Such counters at 290 are therefore not capable without more of accepting the constant 10 MHz. CLOCK pulses and adding thereto unsynchronized additional pulses, as is desired to be done during the automatic zero set cycle, as will be explained hereinafter. For this reason, this first extremely high speed counter 290 is also connected in a sort of feedback loop from the 8-bit output at 282 from counter 290 to a "single count advance logic" circuit 300. This 8-bit output signal 282 enters the logic circuit 300 at a upper input 284, which sets circuit 300 so as to empty (its single held pulse) when the next 10 MHz. pulse (representing 9) is fed to both the counter 290 (over input 280) and to the logic OR gate circuit 300 over input 286. The single count advance logic OR gate 300 will receive any pulses generated by the minus count logic at output 243 (at its input 288) only during the automatic zero reset mode of any operation, since only at such time will its other AND type input 292 be receiving an automatic zero reset enable signal (abbreviated "A/Z ENABLE"). In fact its third AND type input at 294 must also be receiving the second-stage timing signal $S_2$, since it is only at this time during an automatic zero reset cycle that the counter 290 and therefore the following counters are advanced faster than their constantly recycling 10 MHz. rate. Thus when there are present all three AND type inputs 288, 292 and 294, the single count advance logic and gate 300 will accept and "hold" (for a very short time) a pulse from the minus count logic output 243. If such a pulse is present in circuit 300, when the final "detect 8" enable input 284 arrives, circuit 300 will provide at its output 296 a signal to counter 290 to skip the next count, upon the arrival of the 9 pulse at 286. This "skip the next position" (i.e., the 9 count) is readily accepted by the binary code digital counter 290, since this is a command to reset to zero. In other words, all that is required of this binary code type counter is for it to clear its eight bit ON in order for it to skip the 9 count. Since this operation requires substantially less than its full capability (i.e., only a small proportion of 100 nanoseconds), this technique allows the adding of unsynchronized pulses to the counter, although it is normally counting at a rate approaching the maximum it is designed to handle. It should be noted that the pulse rate at input 288 (i.e., the output at 243 of the "minus" count logic) is never more rapid than at a 200 kHz. rate, so that it is impossible for more than one pulse to appear at 288 for each complete cycle of 10 of the counter 290. Thus each pulse fed to the input 288 which is allowed to pass through circuit 300 will always inhibit a different 9 count in the recycling counter 290.

Temporarily assuming that the automatic zero enable signal is not present at input 292 (i.e., the entire circuit is not performing an automatic reset cycle at the moment, and therefore no pulses are being added by circuit 300 to the counter 290) the output 304 of the counter 290 will merely consist (at such time) of a regular 1 MHz. pulse train. This pulse rate, besides being taken off as an available output at 306 (labeled 1 MHz. TIMING SOURCE SYSTEM) is sent to a series of counters so as to step down its rate from 1 megahertz to 1 kilohertz (i.e., from 1 million cycles per second to 1,000 cycles per second). Practically speaking, this is done by having a series arrangement of 3 "divide by 10" recycling counters (compare counters 210 and 220 for example). Thus the "divide by 1,000" counter 310 would normally in fact be such a series of 3 "divide by 10" counters, but is illustrated as a single counter for the purpose of simplifying the drawing. Thus the 1 megahertz input at 306 is converted to a 1 kilohertz output at 312 of the 1,000 divider or recycling counters 310.

Again considering that a single count may be repetitively added during the autozero set mode (and particularly during the second $S_2$ stage thereof), it should be noted that the 1 MHz. output at 304 of the first counter 290 will no longer be entirely regular at that rate. Rather than generating a pulse exactly every 1,000 nanoseconds, the output 304 will sometimes (when a pulse is effectively added by the suppress 9 output 296) occur only 900 nanoseconds after the preceding one. The effect therefore is to advance (the next stage, and therefore all of the counters of) in circuit 310 by a single count at 306 100 nanoseconds before they would have advanced if no pulse had been added by the "skip 9" signal at 296, 302. Thus the circuit involving elements 280—302 effectively adds an additional 10 MHz. (i.e., an extra 100 nanosecond pulse) to the input 306 and the rest of the counters of 310. Therefore for each pulse effectively added by these elements, the final output (at 312) pulses will be shifted forward in time a "phase advance" by 100 nanoseconds. In other words, the time of occurrence of these 1 kHz. pulses (i.e., occurring every million nanoseconds) will be advanced by one hundred nanoseconds (corresponding to 10 MHz.). This allows an incremental advance of the "phase" of the output of counter 310 at 312 of 100 p.p.m. or one ten-thousandth resolution. It is again emphasized that except during the automatic zero reset operation, the "phase" of the 1 kHz. cycle pulses at output 312 will not change; but during each automatic zero reset cycle (and in particular during stage $S_2$ thereof) the phase of this pulse train at 312 may be advanced by any reasonable number of these relatively small incremental steps (i.e., by as many one ten-thousandth step advances as is directed by the input at 288 from the minus count logic). The output 312 (regardless of whether a normal computing cycle or an automatic zero reset cycle is being performed will act as the "on" or "set" input 314 to flip-flop 320. The output at 312 may be also utilized as indicated at 316 as a source of 1 kHz. timing pulses for utilization of other parts of the circuit (e.g., 100 such pulses equal the 100 milliseconds forming $S_1$).

The elements directly below those just described (i.e., 282-—312) are exactly identical to the corresponding elements just described and therefore are not redescribed; rather, each of these elements is identified by a reference numeral exactly one larger (and therefore odd) than their exact equivalent in the upper part of the automatic zero memory and memory increment logic circuit. The only functional difference between the two circuits is that the upper input 289 will carry the "-positive count" pulses from output 242 of the positive count logic, so as to cause the exact same operation of elements 283—313 as previously described (for elements 282—312) whenever a "positive count" pulse appears from the upper or positive count logic circuit at 242 (rather than the "minus" pulses from the "minus count logic" output 243 which are fed to the input 288 of the "minus" automatic zero memory and memory increment logic (elements 282—312). It is somewhat unfortunate that for convenience in drawing it is the "positive" count logic circuit (elements 200—242) having the upper position and even numbers that feeds the lower "positive" auto zero memory (and memory increment) circuit, which is both below and has odd reference numerals 283—313.

The final pulse output at 313 (at a 1 kHz. pulse rate) is fed as the "off" or "reset" input signal at 315 to the flip-flop 320. The flip-flop 320 is so designed that the "off" input at 315 is inhibited for a short period of time after the flip-flop has been turned on at 314 (normal circuit parameters being sufficient in such flip-flops to supply such a short time constant for the "on" input 314 (to dominate or override a substantially simultaneous "off" input at 315). Thus, the flip-flop is always turned on for some substantial part of the 1,000th of a second between "on" pulses before it can be turned off by the input at 315. If the pulses arrive at the flip-flop exactly simultaneously (i.e., there is no phase difference between the "minus" and "-positive" auto zero memory "phase," the flip-flop will be continuously on so that its output 322 is continuously "high" or on. If the "phase" of the "positive" input signals 315 advances ahead of the "on" input pulses at 314 of the "minus" signals, the flip-flop will be turned off prior to the time it is turned on again at 314 by the "minus" pulses again. More particularly the more advanced becomes the "positive" input signals at 313, 315 (because of the addition during the automatic zero cycle operation of positive pulses at 242, 289), the shorter will be the time that the flip-flop is on, and therefore the shorter percentage of the time will there be an output at 322 supplied to the AND gate 330. Thus once the automatic zero reset memory and memory increment logic circuit has caused the "-positive" signal at 313, 315 to advance relative to the "minus" pulse train at 312, 314, the AND gate 330 will be actuated for less than 100 percent of the time that the $S_1$ (integrate) signal is present at the other input 326 thereof. Thus the output of this "$I_0$ GATE" signal AND gate 330 at 332 will be either a continuous signal during the $S_1$ stage (of both normal computation and automatic reset operation cycles) when the two automatic zero memory counters are exactly in phase, but will have less than a 100 percent "duty cycle" whenever the "positive" automatic zero memory and in particular its output 313 has advanced ahead of the originally synchronously interrelated pulses from the "minus" automatic zero memory at 312. Since as noted before, the increments of "phase" advance are equivalent to one part per 10,000 of the basic 1 kHz. signal, the duty cycle of the $I_0$ gate signal at 332 may be finally adjusted from any value from 100 percent downwardly by 0.1 percent increments. It is now emphasized, what was only briefly mentioned before, that in general lead 41 and therefore switching input 42 to electronic switch 22 is not constantly on during the whole 100 millisecond duration of $S_1$. It will be constantly on only when the automatic zero memory and memory increment logic has previously determined during automatic zero reset operation that no correction whatsoever is necessary; i.e., both the minus and positive signals at 315 and 314 are exactly synchronous after an automatic zero reset operation. In general however, the $I_0$ GATE signal (at output 332, lead 334 and therefore input 41) will consist of a series of 1 kHz. (i.e., 1 millisecond cycling rate) square waves which have an "low" or "off" period determined by the number of 100 nanoseconds (i.e., 0.1 percent) increments that the positive pulses at 313 have advanced relative to the ones at 312, as previously described. An exemplary waveform of this chopped signal is shown at 340 above lead 334. Each cycle of these chopped or square wave $I_0$ GATE signals will of course last 1 millisecond as indicated for the particular cycle 342. The off period 344 of each such 1 millisecond period of each such square wave will be determined by the number of increments in units of 100 nanoseconds each (i.e., 0.1 percent of the 1 millisecond period) that the "positive" auto zero memory output signal 313, 315 advanced during the previously performed automatic zero reset operation. In this manner the $I_0$ input at 26 will be attenuated by a factor equal to the "on" portion 346 of the chopped $I_0$ gate signal relative to an entire 1 millisecond period. Thus if, as in the exemplary illustration at 340, the off portion of the cycle 344 is approximately 20 percent and the on part 346 approximately 80 percent, the amount of the DC signal $I_0$ at input 20 passed to the input 26 of the $I_0$ integrating circuit will be only 80 percent of the original $I_0$ valve, relative to the 100 percent of the I that is passed by the electronic switch 12 to its integrating circuit. This FIG. of 80 percent is of course arbitrary and used merely for illustrative purposes. It should again be noted that the adjustment can be made by the automatic zero circuits described to one decimal figure in a percentage (i.e., 0.1 percent) or to three significant figures when the attenuation is expressed as a pure decimal (i.e., 0.800 in the illustrative example).

Thus it is the "duty" cycle of the 1 millisecond (or 1 KHz.) pulse which is supplied to the electronic switch 22 during the 100 milliseconds of the $S_1$ integrate stage which determines the proportion of $I_0$ which is passed to the integrator during this 100 millisecond interval. In general this allows for calibration in an automatic manner (in the exact manner soon to be described) of any "errors" both in the original source (no matter how remote) of the quantities represented by the original inputs I and $I_0$ by merely comparing two signals during an automatic zero reset operation that are "suppose to be" equal. For example in a double-beam spectrophotometer, the "no sample" sample beam intensity signal I should be equal to the "reference beam" intensity signal $I_0$, but in general will not be for the reasons previously mentioned involving not only electrical but also optical and mechanical systematic and varying errors.

It is again emphasized that the "phase relationship" of the automatic zero memory "minus" and "positive" signals and therefore the duty cycle of the $I_0$ gate signal 340 (and therefore the effective attenuation of the $I_0$ input at 20 prior to its reaching integrator input 26) will remain fixed, once it has been set to a specific value by an automatic zero reset operation. Thus the fact that counters 290 and 310 and counters 291 and 311 are constantly rapidly recycling because of the clock pulse at 185', does not change their relative "phase" relationship so as to change in any way the relative on-off time of flip-flop 320 or therefore the duty cycle of the $I_0$ gate signal 340. It is only when an automatic zero reset operation is requested that the "phase" relationship between these counters and therefore their outputs 312 and 313 respectively change. Thus the instrument will remain in calibration and will automatically provide the "correct" attenuation of one of the signals (herein always assumed to be the $I_0$ signal, since it is assumed (or made) to be larger than the I signal), so long as there is no change in circumstances requiring recalibration of the "correct" zero point.

The manner in which the "correct" amount of attenuation is set into the automatic zero memory and memory increment logic during a automatic zero reset operation will now be described. It should be noted at the outset that the operation of an automatic reset cycle is quite analogous to that of a normal computing operating cycle graphically illustrated in FIG. 2, except for the fact that a linear automatic zero reset ramp voltage is utilized, rather than the exponentially decaying computing ramp voltage (at 78b) illustrated in FIG. 2. Thus, FIG. 3, representing in graphical form one automatic zero reset cycle (in an analogous manner to the way FIG. 2 represents a "normal" computing cycle), illustrates the various stages of an automatic zero reset cycle, $S_{A1}$, $S_{A2}$, and $S_{A3}$. Exactly the same operations and exactly the same type of signals are generated during the $S_{A1}$ or "integrate" first stage of an automatic zero reset cycle as were generated during the first stage of the previously fully described "normal" computing cycle. The only difference, is that the original input at 10 will now be supplied with a signal (indicated in FIG. 3 as $I_A$) which is proportional to the "blank" signal. Again merely for illustrative purposes, this signal may represent the detected intensity of the "sample beam" of a double-beam spectrophotometer when no sample material is actually present in the beam. In general, the $I_A$ signal will be a DC voltage that the rest of the circuit should "consider" equal to the other or reference signal $I_0$. Since the $I_A$ signal is one that is meant to be made equal to the reference signal $I_0$ at input 20, it will in general in fact be reasonably close (which is not necessarily true of course during a computing cycle where the I input at 10 may be very different from the reference signal $I_0$ at input 20). For clarity of illustration, however FIG. 3 assumes that there is a reasonably large difference between the two values of $I_A$ and $I_0$, so that during the first or integration stage $S_{A1}$ the integrated value of these two signals at $I_A$, and $I_0$, diverge by an appreciable amount.

Since these integrated signals ($I_A$, and $I_0$,) are formed and fed to the output 52, 62 respectively of the two integrators 17, 27 in exactly the same manner as previously described for "unknown" signal inputs, the manner in which this is accomplished will not be repeated. Suffice it to say that the output at the two integrators will have these signals, indicated at 52aa and 62aa respectively in FIG. 3, in exactly the same way as previously described for the computing cycle situation. The ramp generator 80, also operates during this first or "integrate" stage of an automatic zero reset cycle in exactly the same manner as previously described for a computing cycle; and therefore none of this operation is repeated at this point. The signal of the ramp generator during this first stage of an automatic zero reset cycle is therefore exactly the same as would be true during the corresponding first stage of computing cycle. In particular, it will be the straight line (negative) increasing voltage paralleling the larger (i.e., more negative) of the two integrated voltages $I_A'$ or $I_0'$, but being biased a fixed amount greater (i.e., more negative than the larger). This output (at 100 in FIG. 1) voltage value is of course caused by elements 90, 91, 92, 94 and 99 in exactly the same manner as previously described, the only difference being the exact value of the inputs at 92 and especially 91, now representing the $I_0'$ and in particular the $I_A'$, respectively integrated voltages.

At the end of the first stage of an automatic zero reset cycle, the integrated "blank" sample signal $I_A'$ will have reached point $I_A''$ along curve 52aa. Similarly, the integrated "reference" signal $I_0'$ will have reached point $I_0''$ along curve 62aa; and the ramp generator (integrated) voltage $I_{RA}$ will have reached point $I_{RA}'$ along straight line curve 78aa. As in the analogous situation for the previously described computing cycle end of stage one, the values of $I_A''$ and of $I_0''$ are directly proportional to the original DC inputs at 10 and 20 respectively. Also as in the previously described computing cycle analogous period, the ramp voltage reached at this point, $I_{RA}$, will be more negative by a small constant bias voltage $B_1$ (approximately 0.6 volts in an actually constructed embodiment of the invention) than the larger ($I_0''$ in this case) of the two integrator signals. The second stage $S_{A2}$ of the automatic zero set cycle is different than the corresponding second stage of computing cycle in that the output of the ramp generator will decay along a linear curve 78ab (rather than exponentially as was true during the computing cycle of the second stage). This linear decay of the ramp voltage is indicated as $I_{RA}''$ and straight line curve 78ab in FIG. 3.

The reason that the ramp voltage $I_{RA}$ will decay in a linear rather than an exponential manner during the second stage ($S_{A2}$) of the automatic zero set cycle is that during the automatic zero operation an automatic zero enable signal has been supplied as indicated at 360 to relay 83 so as to cause switch 86 to close to contact 84. Thus when electronic switch 102 is closed during the $S_{A2}$ signal period, a highly regulated current will be fed from the automatic zero current generator circuit 29 from its output 370 through contact 84, switch 86 and closed switch 102 to the input of the ramp generator (and in particular the operational amplifier 98). Since the circuit 29 is constantly sampling, by the closing of the chopping electronic switch 24, a signal proportional to the original $I_0$, the output current fed by circuit 29 to the input of the ramp generator (amplifier 98) will be proportional to the $I_0$ voltage. In this manner the slope of the straight line portion 78ab of the output signal $I_{RA}'$ may be made both highly linear (by careful design of the circuit 29) and proportional to the value of $I_0$ (and therefore of $I_0''$). In this manner the straight line measuring voltage 78ab may be made highly linear and of such slope as to cross the now held integrated voltage value of $I_0''$ (line 62ab) relatively soon, as at point 381; additionally the slope of lines 78ab will be adjusted (by the gain factor of circuit 29 and therefore its steady output current) so as to cross at point 382 the "held" integrated value of the "blank sample" signal $I_A''$. The previously described analog comparators or differential amplifiers will determine during this second stage, in a manner analogous to the similar determination during the previously described normal computing cycle, the two crossing points 381 and 382 of the linearly decreasing (negative) voltage signal $I_{RA}''$ (line 78ab). This will cause the same type of operation of circuit 130 as previously described so as to cause an output of duration of $S'_{A2}$ measured as the abcissa between the two crossing points 381 and 382, again analogously to the normal computing cycle operation. For this reason, one of the AND gates 38 or 40 (and in the assumed condition of $I_0$ being larger than $I_A$, it will be the "positive" AND gate 138) will pass the 10 MHz. pulses, which after suitable division will appear at the output 242. In particular, if a calibrate or single cycle of automatic zero set operation is being performed (i.e., switch 230 making connection with contact 232), there will be a burst of 200 kHz. pulses at the output 242, the length of this pulse train (and therefore of course the number of such pulses) being linearly proportional to the ratio of $I_0''$ to $I_A''$ (and therefore of course proportional to the ratio of the original $I_0$ to $I_A$). Since as previously described during this second stage of the automatic zero set cycle, the other AND type inputs to both single count advance logic circuits 300 and 301 will be present, the appropriate (in this case the "positive" or lower logic circuit 301) will accept and pass to the automatic zero memory and increment logic counters (291, 311 in this case) these "extra" pulses so as to advance its output 313 ahead "in phase" of the output 312 of the corresponding "minus" automatic zero memory counters 290, 310. Thus the "off" input 315 of the flip-flop 320 will be advanced closer to the "on" input 314. Obviously, as may be seen from the original curve 340, this will cause the "on" length of the $I_0$ GATE signal to be made shorter than 100 percent (i.e., the $I'_0$ GATE signal will be caused to have a duty cycle less than 100 percent by an amount proportional to how much the original $I_0$ was larger than the $I'_A$). Since this relationship of the automatic zero memory phases is maintained and therefore fed back to the attenuating chopper 22 in all subsequent cycles, the automatic zero set cycle may be repeated either as a check or as a finer adjustment of bringing the $I_0$ signal passed to the input of amplifier 60 more nearly equal to the $I_A$ signal.

Where the original signals are "noisy" the normal mode of operation will be to first perform an automatic zero set operation in the single or "calibrate" mode so as to set the phases of the automatic zero memory counters to at least approximately the correct phase relationship to cause the correct amount of attenuation by the duty cycle (i.e., the "on" percentage time of the flip-flop 320 and therefore of the $I_0$ GATE signal 340 and attenuating electronic chopper switch 22), and then to perform in at least the 10 average mode a further automatic zero set series (i.e., 10 in this case) of cycles so as to average any noise in the original $I_0$ and $I_A$ signals. By simple arrangements of solenoids and the like, a version of the exemplary circuit has actually been made, which has the capability of allowing a single operator actuated button (called "automatic zero set") to be pressed and cause the automatic zero memory updating by first performing a single cycle of automatic zero set operation, followed by a series of either 10 or 100 average mode automatic zero reset cycles (depending upon the position of switches 230, 231. Such a sequence of operation allows the first single cycle of automatic zero reset to be performed to a high degree of accuracy in a relatively short period of time, so as to bring the chopper 22 attenuated value of $I'_0$ very close to the $I'_A$ value in a short interval of time and then to perform the longer and greater noise suppression averaging type operation thereafter. Obviously such capability is merely an additional convenience to the operator, and is therefore not illustrated, since in the exemplary embodiment the operator may choose to perform the automatic zero reset function in either a single cycle, a 10 cycle averaging mode or in a 100 cycle averaging mode by suitable positioning of switches 230 and 231.

The only component not yet fully described that forms any part of the invention is the so called automatic zero decision logic 400, which merely samples the outputs at 242' and 243' of the last stage positive and minus counters 240 and 241, so as to provide a "decision" as to whether any more automatic zero reset operation appears warranted. The criteria chosen is twofold. The first criterion is that if neither of the counters has an output during an automatic zero set cycle, circuit 400 will supply at its lower output 402 an automatic zero complete signal. In other words, such a signal will appear whenever an automatic zero cycle is requested and the circuit has determined that there is no measurable difference between the attenuated value of $I'_0$ and the (unattenuated) value of $I'_A$. Under such circumstances, it is obviously of no use to request further automatic zero set since a "perfect zero" (i.e., complete balance) has already been obtained. If the input signals $I_A$ and $I_0$ are noisy, it is unlikely that this first criteria will ever be met in practice. Therefore the decision logic circuit 400 also applies a second criterion.

The second criterion which will cause an automatic zero complete signal to appear at the output 402 of circuit 400 is that the number of counts coming from the "positive" and "-minus" counters on leads 242' and 243' respectively are equal, within say one pulse, during any automatic zero reset operation. In other words, the second criterion is that the automatic zero reset operation has caused the best practical ratio of attenuation of the $I_0$ signal, so that the average difference between the attenuated $I_0$ signal and the $I_A$ signal are zero (i.e., their difference is "dithering" about zero). The upper output 404 of circuit 400 is of course the automatic zero recycle signal, which will appear if neither criterion 1 nor criterion 2 have been met so as to allow further automatic zero-set cycling. The input 406 to circuit 400 is merely the information that the number of cycles requested (i.e., 10 or 100) in the particular averaging mode determined by switches 230 and 231 has been reached. It may be utilized either to override the "decision" of circuit 400, since in the particular circuit illustrated when an averaging mode of automatic zero operation is chosen, the automatic zero (partial) correction is made during each of the individual cycles, rather than averaged and applied all at once. In other words, the automatic zero-set operation even in a multiple-averaging mode starts to correct the attenuation factor of chopper 22 after the very first cycle and in general fully corrects it (except for noise fluctuations in the original signals) prior to the number of averaging cycles requested. For this reason criterion number 2 is necessary, since in general the automatic zero set operation is complete prior to the number of cycles (10 or 100) requested. It should be noted however that the use of such an averaging mode does "smooth out" (i.e., diminish the effect of rapidly fluctuating noise) even of each single automatic zero set cycle, since the automatic zero reset approaches zero or balance more gently and is therefore less affected by random noise when the attenuated input $I'_0$ has already been made to approach very closely the $I'_A$ value. In general the automatic zero set operation will consist of at least two single cycles (i.e., even when only a single-cycle type of automatic zero operation is desired) so that the second single cycle will operate as both a check and a finer vernier adjustment of the correction already made. For innately noisy inputs, the automatic zero reset operation will typically consist of first a single cycle (at full 200 kHz. output at 242), followed by either a 10-average (20 kHz.) or 100-average (2 kHz.) series of cycles to obtain the best practical zero (i.e., set attenuation of the $I_0$ by the duty cycle of chopper 22) that may be obtained for signals of analogous noise content. It is again pointed out, however, that once the automatic zero decision logic has determined that no further operations are worthwhile, the automatic zero set operation will cease even though the number (i.e., 10 or 100) of cycles has not actually been completed, since further such automatic zero set cycles can accomplish no useful purpose.

CONVENTIONAL READOUT AND RELATED FEATURES

It will be recalled that the output leads 242 (and/or 243) will contain in digital form the computed function of the two original input signals at I and $I_0$. This main computed output function in digital form is indicated at $D_S$. If, as in the exemplary computing operation already completely described and graphically illustrated in FIG. 2, the particular computing operation has involved performing the logarithm of the ratio of the two input signals (i.e., log $I_0/I$), the number of pulses appearing during a complete computing operation at these two outputs 242, 243 will, in the exemplary spectrophotometer usage, be directly proportional to the absorbance of the sample in the original sample beam, the sample-transmitted intensity of which is proportional to the original input at 10 (I). This logarithm of the ratio, digital output signal may be then fed to any conventional readout unit, an exemplary one being shown at the right-hand side of FIG. 1b. In this particular exemplary readout, the output leads 242 and 243 respectively are connected to the upper contacts 442, 443 of a ganged pair of switches 440 having individual switch arms 444 and 445, respectively. The "positive" signal (assumed to be directly proportional to absorbance for purposes of illustration) is therefore fed by lead 446 to the input 448 of a display counter 450 (comprising for example four binary code decimal, 10-counters in conventional series arrangement). The display counter 450 will therefore accumulate the total number of pulses supplied from output 242 (through 442, 444, 446 and 448); and will transfer this count upon command over lead 452 to a display register 454, which then may feed over output 456 any convenient readout unit or units (e.g., NIXIE tubes) represented by block 460. For purposes of simplification, connections 452 and 456 have been indicated as single leads, but will in general include as many leads as there are individual stages in a conventional serial counter (e.g., four when the display counter comprises four counters each having a 10-bit capacity and representing units, tens, hundreds, and thousands, as is conventionally utilized). An intermediate output at 462 may be taken from the display counter 450 so as to provide the accumulated count in the most convenient form for supplying a conventional decimal type printer. A second intermediary output at 464 may be taken from the display register 454, since this is the most convenient manner in which the data may be supplied to a conventional (serial) data processor. Again these outputs 462 and 464 will typically comprise as many leads as is necessary to carry the individual contents of the number of counters and registers involved (e.g., four in the exemplary readout system).

When the logarithm of the ratio of the two original inputs is the signal being utilized at 242, 442—450, etc., and the input at $I_0$ (even though attenuated after calibration by the automatic zero setting circuit as previously described) is larger than the I input (as will always be true for example in a real sample run of a double-beam spectrophotometer), only the positive output 242 will normally contain any signal. The 9,999 display capacity would be normally utilized such that the first or most significant location (i.e., the 1,000-bit location) will represent a whole number (i.e., be to the left of the decimal point) while the remaining three (hundreds, tens and units will represent the first, second and third places to the right of the decimal point). Thus the final readout will be a whole number followed by a three-place decimal (e.g., 2,695), when reading absorbance.

If the apparatus is being utilized to form the logarithm of $I_0$ divided by I, and $I_0$ is expected to be (even though attenuated by the automatic zero chopping switch 22) at least as large and in general substantially larger than the I signal, as is true in the double-beam spectrophotometer exemplary usage, the negative output 243 will in general have no counts. In order to provide for the possibility that even in this particularly usage the I signal is substantially as great (or even slightly greater than) the $I_0$ signal, a small capacity (i.e., 100) "minus" counter at 451 is provided. Thus the "minus" count output (if any) minus $D_S$ at output 243 will be connected by contact 443, lower switch arm 445, lead 447 and input 449 to this "minus" display counter 451. The "unit" counter 471 and the serially connected 10 binary code decimal counter 481 are connected in conventional serial arrangement, as indicated by lead 473. This additional counter 451 assures that if the I signal is unexpectedly equal to or even slightly larger than the (attenuated) $I_0$ signal, the readout will indicate this unexpected condition. For example, in the double-beam spectrophotometer application assumed, this would mean that the sample in the sample beam was absorbing no radiation, so that the "sample beam" intensity signal I was substantially equal to the (attenuated) $I_0$ signal. In theory the I signal could not, even under such conditions become less than the (attenuated) $I_0$ signal, since the previous automatic zero set operation should have introduced exactly the right compensation (i.e., attenuation at chopping switch 22) of the $I_0$ signal to make them exactly equal. However, different "noise" contributions or some "drift" since the last automatic zero set operation makes it possible that the I signal is slightly larger in this subsequent computing cycle than the attenuator $I_0$ signal. In this case the logarithm of the ratio of $I_0$ divided by I will be a small minus decimal fraction, producing a small number of pulses at output 243 of the "minus" count logic, which will then be counted by the "minus" counter 451.

In order to allow for the possibility that the I signal does exceed the (attenuated) $I_0$ signal during a computing operation, the contents of the "minus" counter 451 should be subtracted (i.e., algebraically added if one considers the "sign" difference) from the contents of the positive display counter 450. Thus, output 483 of the "minus" counter, switch 485, and the second input 488 to the positive display counter 450 schematically represent this algebraic addition of the contents of the "minus" and "positive" counters 451 and 450, respectively prior to the final transfer and final readout of the contents of the "positive" display counter 450.

The operation schematically illustrated by elements 483, 485 and 488 may be readily performed by resetting the "positive" display counter 450 to a value of 9,900 prior to a computing operation, while resetting the "minus" counter 451 to zero at the same time. The "algebraic adding" (or subtracting) of the contents of the two counters at the completion of a computing operation may then be easily accomplished by merely adding pulses to both the "positive" display counter 450 and to the "minus" counter 451 until the "minus" counter 451 is "full" as indicated by its output 483; and then stopping the supply of additional pulses to both counters simultaneously. For example, if there were three "minus" counts in counter 451 (and no pulses had been supplied to the "positive" display counter 450 so that it was still at a value representing 9,900), 97 additional counts would be added to both before the "minus" counter 451 became full. Therefore the final count on the display counter 450 would be 9.997 (representing 9.997 or −0.003 absorbance, in the exemplary use). Since an actual absorbance (logarithmic ratio) of 9.997 would represent a ratio of almost 1 to 10 billion in the relative values of the original input signals I and $I_0$, no ambiguity is introduced. In fact absorbance (logarithmic functions of ratios of intensities) will have maximum values in which the first significant figure will never be greater than about five (i.e., 5.000 absorbance units), since this represents a difference in relative intensity of 100,000 to one. For this reason, any final readout that starts as 9.9... absorbance units is immediately recognizable as necessarily representing a moderately small "minus" absorbance. Obviously in any usage there will be no difficulty for either the operator or any following readout circuits to distinguish between an actual reading of 9.997, for example and its more likely meaning of minus 0.003, since this represents a 10 billion fold difference in the original value of the measured I input signal. Thus no ambiguity is possible in any usage whatsoever of the circuit, even those unrelated to the illustrative exemplary use.

Returning to the $I_R$ ramp function generator circuit shown generally near the bottom of FIG. 1a, the adjustability has already been noted of the various resistors and potentiometers 108, 110 and 112 which are in the circuit only during the second stage $S_2$ of a computation cycle (i.e., not involved at all in the automatic zero step operation). The effects of adjusting these various resistors is of course to vary the particular exponential curve generated in FIG. 2 at 78b, thereby allowing the computed signal, for example, at output 242, to be exactly equal rather than proportional to a specific function proportional to the logarithm of $I_0$ divided by I. Thus in the double-beam spectrophotometer exemplary usage, the final output may be in exact absorbance units (e.g., 1.987 when the sample passes only slightly more than 1 percent of the sample beam radiation) or in direct concentration of the sample units (which is in theory also directly proportional to this absorbance, but would involve a linear coefficient). By correct adjustment of the larger "concentration" and the finer "concentration vernier" potentiometers, the final output may be made equal to rather than merely proportional to either the actual absorbance or the actual concentration of the sample material.

At 500 is indicated a curvature current generator circuit which (again only during the same second stage of a computing cycle operation) may supply a small additive current at its output 502 (proportional to a fraction of $I'_0$) into the discharge path of capacitor 104 through the resistors 108, 110 and 112 (namely at point 504 between elements 110 and 112), so as to change slightly curve 78b from its original exponential curvature to a somewhat modified curve; this allows computation of functions that do not exactly follow a theoretical exponential or logarithmic form. For example in atomic absorption double-beam spectrophotometers, the actual concentration of the sample component, although theoretically following the Lambert-Beer Law (which except for proportionality constants is a theoretically perfect exponential function) will in practice deviate slightly therefrom. This curvature correction circuit 500 therefore allows for introducing an intentional deviation to compensate for this slight variation from the theoretical exponential curve. Since this curvature correction circuit forms no integral part of the present invention, it is merely mentioned that it is adjustable by choosing (manually at input 512) when the curvature correction will start (i.e., the lowest point of curve 78b at which deviation from that exponential curve will be caused) by a "onset" variable control, and the "magnitude" or extent of such deviation from the original exponential curve 78b may be manually adjusted so as to vary the characteristics of circuit 500 at input 514. At input 516, the circuit receives a signal proportional to $I'_0$ (from lead 92); and at its last input 518, it receives a signal $I_R$, equal to the output of the ramp generator by means of lead 520. These inputs cause the output 502 to "bend" from curve 78b by a small amount (and starting at an appropriate point) this computing curve, to account for the generally small and usually smooth deviations from the ideal exponential function (e.g., concentration) encountered in actual practice (e.g., in atomic absorption double-beam spectrophotometers).

MATHEMATICAL BASIS OF OPERATION

It can be easily shown that the time period (i.e., the abscissa difference) between, for example points 81 and 82 in FIG. 2 will in fact be proportional to the logarithm of the ratio of $I''_0$ divided by $I''$. Let $V_C$ represent the voltage across the capacitor 104 when it is discharging through the resistive chain 108, 110, 112, during a computing cycle, as shown by curve 78b in FIG. 2. Under such circumstances the voltage (ordinate) value of curve 78b, $V_C$ will be given by the following equation:

$$V_c = K\, e^{1t/T}, \qquad (1)$$

where K is some constant (including both 1, and in this case a minus quantity); and the remaining right-hand term is the well-known exponential time $t$ decay of the voltage in a circuit having the time constant T, given by the product of the circuit resistance R and capacitance C, as is well known, thusly:

$$T = RC. \qquad (2)$$

The exponential curve 78b will cross (i.e., equal) the constant $I''_0$ value of straight line curve 62b at a first time $t_1$, indicated (by the abscissa value of the time) at point 81, thusly:

$$V_{C1} = I''_0 = K\, e^{t_1/T}, \qquad (3)$$

where $V_{C1}$ is the voltage value of curve 78b at this crossing point 81 (i.e., the ordinate value of point 81); and $t_1$ is the time value (i.e., the abscissa) of this same point 81. When the voltage has decayed so that it now equals $I''$ (i.e., curve 78b crosses curve 52b at point 82), we have the analogous equation:

$$V_{C2} = I'' = K\, e^{t_2/T} \qquad (4)$$

when $V_{C2}$ is the ordinate value of point 82; and $t_2$ is the abscissa value of this point 82.

Dividing equation 3 by equation 4 yields:

$$\frac{I_0''}{I''} = \frac{e^{-t_1/T}}{e^{-t_2/T}} = e^{t_2/T - t_1/T} = e^{\frac{t_2 - t_1}{T}} \qquad (5)$$

Taking the logarithm of both sides of equation 5 yields:

$$\log \frac{I_0''}{I''} = \frac{t_2 - t_1}{T} \qquad (6)$$

Thus the desired logarithm of the ratio of the $I''_0$ divided by $I''$ is in fact directly proportional to the difference in the (time) abscissa value of point 82 and point 81. The right-hand term of equation 6 is of course directly proportional to this difference, hereinbefore designated the count or $S'_2$ output signal. The ordinate (voltage) values of $I''_0$ and $I''$ are respectively proportional to the actual inputs ($I'_0$ and $I'$, respectively) to the two integrators 50, 60 by the same proportionality constant, say $k'$, if the two integrator circuits are identical. We may therefore write:

$$\frac{k' I_0'}{k' I'} = \frac{I_0''}{I''} \qquad (7)$$

The assumption that the two proportionality constants $k'$ are equal, actually is unnecessary since the automatic zero calibration operates on the outputs of the integrators, so that it will correct any "errors" introduced not only prior to but also within the integrator circuits (for example by lack of exact equivalents of components). Thus the left-hand term of equation 7 may be simplified to $I'_0/I'$ even if the two "constants" $k'$ are not in fact identical in the circuit, since the automatic zero calibration will effectively make them so. Accordingly we may write, even under these circumstances, the proportionality equation:

$$\frac{I_0'}{I'} = \frac{I_0''}{I''} \qquad (8)$$

Thus, once the circuit has been "automatically zeroed" or balanced as previously described, the proportionality equation 8 will be true, and we may substitute the left-hand fractional term for the right-hand fractional term in equation 6 thereby yielding:

$$\log \frac{I_0'}{I'} = \frac{t_2 - t_1}{T} \qquad (9)$$

By adjusting the time constants, T, in equation 9 (as by the variable resistors 108, 110 and 112) to a suitable value, relative to the gain of the various parts of the circuit, the final output (e.g., $D_S$ at 242) may be made either equal (for absorbance measurements directly) or proportional in any desired manner (for "concentration" measurements) to the desired logarithmic function (i.e., the left-hand side of equation 9). Thus the T in the right-hand side may be easily either adjusted or balanced out by the gain of the other circuitry so as to give a final output (e.g., at 242) which is either equal to or proportional to in any desired manner the logarithm of the ratio of $I'_0$ and divided by $I'$.

The corresponding mathematical analysis of how the automatic zero cycle forms the desired signal, namely, a signal $S'_{A2}$, proportional to the difference between the $I''_0$ and the $I''_A$ is now given. Since the ordinate (voltage) value of the ramp signal 78ab in FIG. 3 is linear, during an automatic zero cycle, this voltage ordinate value may be written in the form:

$$V_A = -St + k, \qquad (11)$$

wherein $V_A$ is the voltage value at any time along straight line ramp voltage portion 78ab; S is the slope of this straight line; $t$ is of course the time (abscissa) value at any given moment (during the second stage of the automatic zero cycle, namely, $S_{A2}$); and $k$ is any constant (including a negative value). At the point that straight line segment 78ab crosses the $I''_0$ horizontal voltage (line 62ab) at point 381, the ordinate voltage value will be given by:

$$I''_0 = -St_1 k. \qquad (12)$$

When the straight line decreasing (i.e., becoming less negative) voltage curve 78ab crosses the constant voltage line 52ab at point 382, (i.e., the value corresponding to $I''_A$) at a later time, the equation representing this equality crossing is:

$$I''_A = -St_2 k. \qquad (13)$$

Subtracting equation 13 from equation 12 yields:

$$I''_0 - I''_A = -St_1(-St_2) = St_2 - St_1 S(t_2 - t_1). \qquad (14)$$

Thus the desired difference between the two integrated signals (the left-hand term of equation 14 above) will be proportional to the difference in abscissa values between points 381 and 382 (see the last term in equation 14 above), or in other words proportional to the time interval, $S'_{A2}$, as previously stated but not proved. As in the analogous case for a computing cycle, rigorously explained just before, the held integrated values ($I''_0$ and $I''_A$, respectively) are each directly proportional to the signal inputs ($I'_0$ and $I'_A$, respectively) being integrated during the first stage of the automatic zero cycle. We may therefore write the linearly proportional relationships:

$$k' I'_0 = I''_0 \text{ and,} \qquad (15)$$

$$k' I'_A = I''_A. \qquad (16)$$

Subtracting equation 16 from equation 15 yields:

$$k' I'_0 - k' I'_A = k'(I'_0 - I'_A) = I''_0 - I''_A. \qquad (17)$$

Substituting the middle term of equation 17 for its equivalent right-hand term into equation 14 yields:

$$k'(I'_0 - I'_A) = S(t_2 - t_1), \qquad (18)$$

which may be rewritten in the form of:

$$I_0' - I_A' = \frac{S}{k'}(t_2 - t_1) \qquad (19)$$

By adjusting the slope S of the straight line ramp portion 78ab, and in particular relative to the straight line integration constant (at least proportional to $k'$), the proportionality constants in equation 19 may be made to have any convenient value so as to cause the time between $t_1$ and $t_2$ to be short enough for convenience but long enough for fineness of adjustment for the particular range of values that the "considered to be equal" input signals are likely to depart from true equality. Since the automatic zero operation will null the difference between the times (i.e., make $t_2 - t_1$ approach zero), so that at balance the $S'_{A2}$ signal goes to zero, the proportionality factors in equation 19 will not change, in theory, the balance point (i.e., the amount that the $I_0$ original signal will be attenuated by the chopping switch 22, after an automatic zero operation is complete), but will merely affect the speed of operation and the fineness of the adjustment. It has been found that for the type of exemplary usage given, with an "integrate" first stage period of approximately 100 milliseconds, the various slopes (of lines 52aa, 62aa and 78aa on the one hand and of line 78ab on the other hand) are conveniently chosen so that the usual time of the second stage $S_{A2}$ will initially require about 10 milliseconds. It should be noted that the automatic zero current generator circuit 29 will receive an input proportional to the original signal $I_0$ during this second stage (since electronic switch 24 is closed in view of the lack of any signal at its input 46 during any stage after the first one). Therefore the slope of line 78ab can be automatically varied in proportion to the value of the original input, so as to tend to maintain the automatic zero second stage period relatively constant. This is so since the actual difference between, say, $I''_0$ and $I''_A$ will in general increase with their actual value (or stated in other terms the percentage difference between the two signals will tend to remain within a relatively small range, so that larger actual signals will tend to be farther apart in, say, millivolts). Thus the time required to complete say one automatic zero cycle will not vary very much even if the two input signals both vary (together) by a relatively large factor, as will occur for example in the illustrative usage when the radiation source of the spectrophotometer (or the efficiency of the optics, including say the monochromator) varies over a large range, as long as the relative amplitudes of the two input signals that are "considered to be equal" do not vary from each other (in percentage) by too large an amount (e.g., plus or minus 10 percent).

In all of the preceding discussion it has been assumed that the original $I_0$ signal at input 20 will never be smaller than the I input signal at 10. Although this will be essentially always true during actual computing runs in the exemplary usage (since the I signal during a computing cycle represents the same intensity radiation beam after a substantial part has been absorbed by the sample), it is nevertheless not necessarily true even in the exemplary usage that this situation will be true during a calibrate or "automatic zero" operation, since at such time the two signals are merely expected to be approximately equal (since there is no sample in either beam at this time). In the exemplary embodiment, only a single attenuator (chopper 22) is actually utilized, so that only the $I_0$ channel can be actually attenuated by the automatic zero reset operation (i.e., the $I_0$ GATE signal). Although it would be practical to include a chopping attenuator in each channel, it is both simpler and more economical merely to insure that the nominal $I_0$ signal operated on is always maintained greater than the I signal (even when the actual values of their sources such as detector circuits are in fact otherwise), by utilizing a larger input resistor at 11 than at 21. The attenuating chopper 22 would then merely cause sufficient attenuation of the larger proportion of the $I_0$ signal at the right-hand side of the smaller resistor 21 to compensate for the fact that resistor 11 is larger. For example in an actual embodiment, the larger input resistor 11 had a value of 132 K ohms; while the smaller $I_0$ input resistor 21 had a resistance value of only 110 K ohms. Thus the $I_0$ signal at the right-hand side of the smaller input resistor 21 is intentionally artificially augmented relative to the I signal at the right-hand side of the larger input resistor 11 by a factor of $$\frac{132K \text{ ohms}}{110K \text{ ohms}} = 1.20$$

Because of this artificial intentional increase of the effective signal entering in the $I_0$ channel, the attenuating chopper switch 22 will have a duty cycle (i.e., "on" time relative to its entire cycle) of 1/1.2 (equal to 0.825) when the original inputs at 10 and 20 are actually equal. In this manner whenever the duty cycle of the chopping switch attenuator 22 is greater than 82.5 percent, the attenuator will actually be acting to apply inverse attenuation (i.e., balance what is originally an actually larger signal at input 10, so that the rest of the circuit "sees" the signals as equal). By this simple expedient, a single attenuator can effectively attenuate either channel, since when its duty cycle is above 82.5 percent it is effectively attenuating the I channel, not the $I_0$ channel is actually in. In fact for this exemplary embodiment, the chopping attenuator switch 22 can "attenuate" the $I_0$ signal to a value of 120 percent of its true value relative to I; stated in other terms the chopper 22 can effectively attenuate the I channel by multiplying it by a factor less than 1 (namely down to 0.825), since a 100 percent duty cycle of the chopper in view of the different resistor values of 11 and 21 will cause the rest of the circuits to "see" an I signal which has been effectively "attenuated" (because of the different resistors 11, 21) by a factor of 100 divided by 120 (obviously equal to the 132 divided by 110, representing the relative values of the input resistors).

Thus although it is really the combined action of the smaller resistor 21 and the chopping attenuator 22 relative to the larger resistor 11 that determines the actual used inputs to the circuit, for purposes of simplicity, the foregoing description has not included this fact. It will be obvious however that this does not effect in any way the validity of the description or operation previously given, since it is the duty cycle of the chopping attenuator 22 times the relative resistive values of 11 and 21 which determines the real relative attenuation of the two channels. Thus for the exemplary embodiment an 0.825 (82.5 percent duty cycle) attenuation by element 22 will cause two actually equal input signals at 10 and 20 to be "seen" as equal, and the effective attenuation of the chopper will be the percentage of time that is actually on (see part 346 of waveform 340) relative to this 82.5 percent "real balance" attenuation that will be supplied when the original input signals are actually equal. Thus, for example the 80.0 percent duty cycle assumed previously for exemplary purposes, will really represent only an 80.0/82.5 overall attenuation of the original signal at $I_0$. With the minor reservation that one should consider this 82.5 percent duty cycle as being the one that balances the two input resistors effect, no substantial difference is actually caused in the various operations already fully explained, the relative attenuation of the $I_0$ channel being merely computed on the basis of an 82.5 base rather than one of a hundred, to compensate out the difference in the input resistors 11, 21. Since this compensation of the "smallness" of the resistance value of 21 occurs before the inputs of the integrators, it will not affect the operation thereof or any of the following circuits in either of the "computing" or "automatic zero" operations. If the current is fed to the automatic zero current generator circuit 29 in the manner shown, it may be thought of as including an 0.825 gain factor element to eliminate the effect of the "too small" resistor at 21; in reality however the slope of the straight line 78ab in FIG. 3 is actually chosen for convenience, as previously explained, and its exact slope will not affect anything other than the speed and fineness of the nulling caused by the automatic zero operation, as previously explained. This is so since the line 62ab in FIG. 3 will be made to be coincident with the line 52ab upon completion of a full automatic zero (recalibration) operation so that the slope of line 78ab only affects the rate at which such eventual "nulling" occurs and not the "balance" value itself, as previously noted.

ADDITIONAL FEATURES

Although described for purposes of concreteness in terms of a specific application, the entire circuit is capable of operating on any types of DC inputs to provide a desired function (and in particular the logarithm of the ratio of the inputs) in digital (and also in analog) output form. The most important novel feature of the circuit is its ability to automatically calibrate itself and "remember" this calibration by means of a unique automatic zero set and memory capability. Other advantages have in general been explained in conjunction with a detailed description of the entire circuit.

It is deemed self-evident, in view of the automatic zero set operation explanation (see FIG. 3 in particular), that the circuit can also provide, as a computed output during a normal computing operation, a difference of the two input signals, merely by using a straight-line function as at 78ab in FIG. 3 to measure the relative values of the integrated inputs. Such a difference capability is already present (and indeed is performed during an automatic zero set operation) by merely feeding over lead 370 when switch arm 86 is in contact with 84 a steady DC current of a value such as to form any desired slope of the linearly decaying measuring voltage (analogous to 78ab in FIG. 3) as may be desired to form an exact such subtraction (or a difference multiplied by a particular constant). Indeed such capability is useful in a double-beam spectrophotometer, for example, where it may be desirable to read out the final data in the form of linear absorption of the proportion of radiation absorbed by the sample, which is proportional to the linear difference between the reference beam intensity $I_0$ and the transmitted (through the sample) sample beam intensity signal I, thusly: $K_T(I_0-I)$, once the "no sample" sample beam intensity $I_A$ has been balanced with the reference beam intensity $I_0$ by an "automatic zero" or calibration operation (i.e., $I_0-I_A=0$; or $I_0=I_A$). Since this (linear) measured absorption of the actual sample, $K_S(I_0-I)$, is most conveniently expressed as a percentage, i.e., 100 $(I_0-I)$ percent, the various scale factors of the circuits may be adjusted to cause the proportionality constant $K_S$ times the steady reference level signal, $I_0$, to equal 100 (i.e., $K_S I_0=100$), so that $K_S(I_0-I)$ will be directly in percentage of sample absorption (e.g., 27.9 percent, where $K_S I_0=100$, and $K_S I=72.1$).

To allow measurement of signals of either the form, $I_0-I$, or of the form, $I-I_0$ (or in the more commonly used "absorbance" mode of the exemplary usage of either the usual log $I_0/I$ or the less likely required log $I/I_0$ form), various reversing switches are provided in the readout parts of the circuit (such as the already mentioned one at 440 and the switch 550 at the lower left-hand corner of FIG. 1b). Such switches insure that the large "positive" display counter 450 (rather than the smaller capacity "minus" counter 451) receives the computed digital signal, and that the analog recorder circuits (element 150 and following) yield the desired "sign" of the equivalent analog information.

As previously noted, the circuit as illustrated is capable in general of computing the desired function of the two inputs, even if the I input is larger than the $I_0$ input (although specifically assumed to operate under the condition that the $I_0$ signal is at least as large as the I signal). In particular the outputs at 120 and 128 of the two differential amplifiers or comparators would then merely occur in the opposite order (in point of time) as previously described and the data count gate logic circuit may readily be adapted to distinguish this situation from the converse case (or a simple reversing switch placed at the inputs 122, 129 thereof).

When it is desired to find the absorption percentage (i.e., by what percentage does $I_0-I$ differ from $I_0$), the normal operation of the automatic zero circuit will cause (as previously described) the $I_0$ signal (treating both the resistor 21 and the chopping attenuator 22 as a unit) to be attenuated to the actual value of the no sample, $I_A$, signal in the other channel during this calibration. For percentage absorption measurements in an absorption-type spectrophotometer, this bringing of the $I_0$ attenuated level to the $I_A$ level (i.e., "raising" line 62ab to be coincident with line 52ab in FIG. 3) is the desired effect to obtain the actual percentage absorption of a sample when it is put in and a computer operation initiated. For example if the original intensity of a $I_0$ is 100 units, while the "no sample" signal in the other channel, $I_A$ is 90 units, and a sample is later placed in this second channel and it produces a real "sample" signal at I of 45 units, the actual absorption percentage of the sample should be related to the 90 units of radiation which would otherwise have passed through it, not the 100 that was originally present in the other reference channel $I_0$. In other words it is desirable to attenuate the $I_0$ signal from 100 units down to the $I_A$ of 90 units, before comparing (during a subsequent computation) the I signal to the $I_0$ signal (now reduced to 90 units). This of course is the normal operation of the automatic zero circuit as previously described. In particular the $I_0$ signal will be attenuated so as to cause the two straight line integration 62aa and the held value 62ab of the reference channel to be attenuated (i.e., made less negative) so as to approach and finally become coincident with the corresponding $I_A$ integrated and held signals (52aa and 52ab, respectively). Thus in the example just given, the $I_0$ signal will be attenuated from 100 units down to 90 during the automatic zero reset operation; and during a subsequent computing operation, the tested sample signal I will be compared to this lower (90 units) attenuated value of $I_0$, so as to represent the correct proportion of energy absorbed, namely 10/9 times 90- —45 equal to 50 percent (rather than being linearly related, i.e., proportional to, the difference between the original unattenuated $I_0$ signal and the sample signal, that is not proportional to 100 minus 45 equal 55). Thus in the previous discussion, just above, the $K_S$ proportionality coefficient should reflect the manner in which the original $I_0$ signal was attenuated in order to equal $I_A$, since the $I_0$ in the expression $K_S(I_0-I)$ is of course the original $I_0$ signal after it has been attenuated to equal the $I_A$ signal. Such a scaling factor may be readily introduced as by a manual potentiometer any place in the circuit and may even be made automatic (by automatic gain control). This scaling factor is the attenuation of the original $I_0$ effected by the proportional deviation from the "normal" 82.5 percent duty cycle.

As previously broadly mentioned, in order to perform a linear (i.e., difference) type of actual computation, a linear ramp, analogous to 78ab in FIG. 3, must be formed not only during the automatic zero mode of operation, but also during the normal computing operation. Thus during a difference type of computation (rather than the logarithmic ratio one), the discharge of the $I_R$ ramp function should not be exponential as shown at 78b in FIG. 2, but rather linear, and therefore more analogous to the straight line shown at 78ab in FIG. 3. One manner of supplying such a straight line discharge during any "difference" or linear-type measurements is shown near the middle bottom of FIG. 1a. This includes a switch 600 normally closed to contact 602 (so as to create the exponential discharge during the second stage of the logarithmic computation previously described, involving resistors 108, 110 and 112). When switch 600 is moved to its linear mode position, it opens this resistive discharge path of capacitor 104 (even during the $S_2$ computing stage) and connects instead to the right-hand side of resistor 110 at input 606 a fixed voltage (e.g., minus 12 volts) source 610. The electronic switch or field effective transistor 612 allows the fixed voltage 610 to supply a constant current through resistors 110, 108 and therefore to the input 96 of the operational amplifier 98 only during the $S_2$ stage. Thus when a difference or other linear-type computation is desired, switch 600 causes the discharge of the integrated ramp voltage $I'_R$ in FIG. 2 to discharge linearly (as in FIG. 3) and not exponentially as in FIG. 2.

The illustrated circuit is also capable of computing the, for example, I input value in "absolute" terms (i.e., not relative to the $I_0$ input value). This is useful, for example, in atomic absorption spectrophotometers, where it may be desirable to measure the emission of the sample in the (sample channel) channel I. In this case the emission signal (also referred to as an intensity signal hereinafter) to be measured is computed as a linear function of some fixed reference level. The input to the $I_0$ (reference) integrator 27, may be made to automatically attain a fixed value by the addition of the elements which may be optionally connected to input contact 650. Specifically when switch 652 is moved from its normally open position so as to make contact with input 650, an "intensity" reference source 660 will be connected to this input during the first or integrate stage $S_1$. The parameters of the source 660 are so chosen that it will supply a current of approximately half the value and of opposite sign to that produced at the output 26 of switch 22 by a normally expected $I_0$ signal. For the exemplary value of plus 8 volts $I_0$ signal at 20, an input resistor of 110 K ohms at 21 and a attenuating factor of 0.825 during the "normal" duty cycle of the chopping switch 22, the intensity source 660 may consist of a fixed minus 12 volt source 664 and a 390 K ohms resistor in series so as to supply at output 668 approximately one-half as much current (but in the opposite direction) as will normally be present at output 26 of the $I_0$ channel.

To "calibrate" the circuit when the intensity mode switch 652 is closed, the usual automatic zero reset operation will be performed. However in this case the $I_A$ signal in the "sample" input 10 will be normally extremely small (in the absence of a sample, the emission will be virtually zero). Therefore, referring to FIG. 3, the $I'_A$ integrated signal will have a very slight slope (i.e., remain near zero, even at the end of the integrate period at $I_A''$). Therefore at the end of a complete automatic zero set operation, the $I_0$ signals will be also coincident to lines that are very close to zero. The main significance of the addition of the intensity reference source 660 during this integrate period, is that the chopping switch attenuator 22 need only approximately halve (i.e., have a 50 percent of its normal duty cycle) the unattenuated intensity of the $I_0$ signal in order to drive the output of the integrator 60 to values near zero. In this manner the attenuating chopper 22 will be nearly midway between its minimum and maximum "duty cycle" when the automatic zero operation is completed. It will therefore have about one-half of its total attenuation range available to further attenuate the $I_0$ signal or to enhance it. Thus the $I_0$ channel will be "zeroed" (and in this case since the "no sample" signal to which it is balanced $I_A$ is very small, the attenuated $I_0$ signal will in fact be quite close to true zero) without exhausting the range of the attenuating chopper. Thus the automatic zero operation in this "intensity" mode provides a "live" zero (i.e., there is still available a large amount of adjustment of the attenuator in either direction from this point). A computation in this intensity mode will be analogous to any linear type of measurement. In particular the emission of the sample in the I channel will be integrated during the first stage of the computation cycle (as exemplified by say straight line 52a in FIG. 2). However the $I_0$ signal will (since it has been balanced in effect with a no emission situation) will be very small and therefore nearly a horizontal line in FIG. 2. The $I_R$ integrator ramp voltage will now follow the larger (more negative) I' signal, since circuit 80 will cause the $I_R$ signal to always be slightly more negative than the larger of the two types of inputs (I' or $I'_0$). Since under such emission "intensity" computing conditions, the switch 600 will be in its "linear" position (i.e., in contact with 604) during the second or compute stage, the $I_R$ voltage will linearly decrease so as to cross first the more negative I'' signal and later (near zero) the very small $I''_0$ reference signal. Thus the intensity of the emission of the sample may be compared to the "reference" signal, which in turn has been balanced against a "no sample" condition of the sample channel. In this manner the computed intensity of the I channel will be linearly related to the actual emission of the sample itself.

It is emphasized that the "linear" constant current source 610 is used (i.e., switch 600 in its upper position so as to make contact with 604) during the second (or "compute") stage, $S_2$, of a linear (i.e., difference) type of actual computation operation only (i.e., not during an automatic calibration operation). The automatic zero (constant) current generator circuit 29 will, of course, supply the linear discharge during the second stage, $S_{A2}$, of all automatic zeroing operations, regardless of what type of computation (i.e., logarithm-of-a-ratio or a linear, i.e., difference type) is to follow this equilibrating of the two channels. Finally, the "intensity" constant current source 660 will be connected to the input of the $I_0$ integrator (60, etc.) by switch 652 (only during the first or integrate stage $S_1$, because of electronic switch 662) during both the automatic zero operation and the subsequently performed actual computation operations, whenever the attenuated $I_0$ signal is intended to be driven to a value close to zero (i.e., $I_A$ is near zero). This current source 660 "bucks out" about one-half of the $I_0$ signal current (at 26) for a "normal" duty cycle of attenuating chopping switch 22, so that about a 50 percent of normal duty cycle (i.e., about 42.5 percent in the exemplary embodiment) of the chopping attenuator 22 will cause the attenuated (about one-half) $I_0$ signal minus this "bucking" current (from source 660) to approach zero. Thus a "live zero" is obtained, since the chopper 22 duty cycle can vary from this half value so as to cause the attenuated $I_0$ signal minus the bucking signal to vary from about $+\frac{1}{2} I_0$, to about $-\frac{1}{2} I_0$ (where $I_0$ is the unattenuated full input signal). As noted above, this capability is especially useful for comparing (in a linear fashion) the value of an I (sample) signal (such as sample emission) to a "near zero" reference signal, (e.g., the attenuated to near zero $I_0$ signal, which has been equilibrated to the near zero "no sample" emission $I_A$ of the sample I channel) when this "intensity" mode (i.e., using source 660) of linear (difference) type of computation is accomplished.

SUMMARY

The "automatic zero set" or self-calibration capability is at the heart of the invention embodied in the illustrated circuit. In the exemplary embodiment the attenuation provided at the input of the larger signal $I_0$ (by the attenuating chopper switch 22) is applied in a linear manner (i.e., as a percentage of a duty cycle of a switch), so that the "automatic zero reset" operation (see FIG. 3) is determined and "remembered" in a similar linear form.

However, it is possible to alter (in a "remembered" way) either of the two inputs in some other manner (i.e., by a different mathematical operation, other than percentage duty cycle chopping in particular or even linear attenuation in general) so as to cause the desired "balance" between the calibration inputs (e.g., $I_A$ and $I_0$). Thus even the relatively general functions performed by the inventive "automatic zero set" (i.e., bringing to a specific type of balance condition) operation may be varied without departing from the inventive concept herein fully disclosed in an exemplary embodiment and explained in terms of purely illustrative usages. Accordingly the invention is not limited to any of the specifically illustrated components (nor, of course, to any specific details) of any parts of the disclosed exemplary circuit and its operation; rather the invention is defined by the scope of the appended claims.

I claim:

1. In a measuring circuit for determining a desired mathematical relationship between a first variable signal and a second signal, comprising:
   a first signal input means;
   a second signal input means;
   said first and second input means being common inputs to a first computing circuit and a second calibrating circuit;
   said first circuit comprising means for computing said desired mathematical relationship between said first and second signals applied to said first and second input means respectively, under normal operating conditions;
   said second circuit comprising means for comparing a "-blank" calibrating signal at said first input to a second signal at said second input means and forming a second mathematical relationship therebetween;
   automatic recalibrating means associated with said second circuit for effectively changing at least one of said signals at one of said first and second input means by a third mathematical operation to cause said second mathematical relationship to attain a specific predetermined value;
   calibration memory means associated with said automatic recalibrating means for storing said third mathematical operation necessary to cause said second mathematical relationship to be maintained at said predetermined value;

and means for performing said stored third mathematical operation on signals presented at at least said one input means during subsequent operations of said first computing circuit;

whereby undesired error variations in the sources of said first and said second signals are eliminated from such subsequent computing operations of said first computing circuit means.

2. A measuring circuit according to claim 1, in which:

a substantial part of each of said first computing and said second calibrating circuits comprises the same commonly shared components, so that said commonly shared components are utilized during both normal computing operations and during automatic calibration operations;

whereby an appreciable reduction in the total combined number of components required for both said first and said second circuits is effected.

3. A measuring circuit according to claim 1, in which:

said first computing circuit comprises an analog-to-digital converting means;

whereby the results of said computed desired mathematical relationship are available in digital form.

4. A measuring circuit according to claim 3, in which:

said second calibrating circuit comprises also said same analog-to-digital converting means;

and said automatic recalibrating means associated with said second circuit is in such relative location as to receive said second mathematical relationship in already converted-to-digital form;

whereby said third mathematical operation is performed in a digital manner so as to insure freedom from "drift" and other varying errors of components of said second calibrating circuit.

5. A measuring circuit according to claim 1, in which said first computing circuit comprises:

means for temporarily storing a pair of signals having magnitudes at least proportional to each of said two input signals, respectively;

means for forming a comparison ramp signal which continuously changes in amplitude according to a known mathematical curve;

comparator means for determining when the amplitude of said changing comparison ramp signal is equal to each of said pair of stored signals;

and means for measuring the elapsed time between when said comparator means determines such equality with said changing comparison ramp signal and each of said pair of stored signals;

whereby said determined elapsed time is a particular mathematical relationship of the relative magnitudes of said pair of stored signals, and therefore of the values of the two input signals; said particular mathematical relationship being determined by said mathematical curve of said continuously changing comparison ramp signal.

6. A measuring circuit according to claim 5, in which:

said comparison ramp signal forming means is of such construction as to at least optionally generate an exponentially changing ramp signal;

whereby said measured elapsed time is a logarithmic function of the ratio of said two input signals, which is said desired mathematical relationship.

7. A measuring circuit according to claim 5, in which:

said comparison ramp signal forming means is of such construction as to at least optionally generate a linearly changing ramp signal;

whereby said measured elapsed time is at least directly proportional to the difference between the values of said two input signals, when this is said desired mathematical relationship.

8. A measuring circuit according to claim 5, in which:

digital conversion means are operatively connected to said elapsed time measuring means, to provide a number of digital pulses which number is directly proportional to the length of said measured elapsed time.

9. A measuring circuit according to claim 5, in which:

analog readout means are operatively connected to said elapsed time measuring means, to provide an analog signal having an amplitude proportional to said length of said measured elapsed time.

10. A measuring circuit according to claim 1, in which said second calibrating circuit comprises:

means for temporarily storing a pair of signals having magnitudes at least proportional to each of said two input signals, respectively;

means for forming a comparison ramp signal which continuously changes in amplitude according to a known mathematical curve;

comparator means for determining when the amplitude of said changing comparison ramp signal is equal to each of said pair of stored signals;

and means for measuring the elapsed time between when said comparator means determines such equality with said changing comparison ramp signal and each of said pair of stored signals;

whereby said determined elapsed time is a particular mathematical relationship of the relative magnitudes of said pair of stored signals, and therefore of the values of the two input signals; said particular mathematical relationship being determined by said mathematical curve of said continuously changing comparison ramp signal.

11. A measuring circuit according to claim 10, in which:

said comparison ramp signal forming means is of such construction as to generate a linearly changing ramp signal;

whereby said measured elapsed time is at least directly proportional to the difference of the said two input signals, which therefore is second mathematical relationship.

12. A measuring circuit according to claim 11, in which:

said automatic recalibrating means comprises means for changing at least one of said input signals before said temporary storing means in such a manner as to cause said measured elapsed time to be reduced substantially to zero;

thus causing said second mathematical relationship which is the difference in the changed calibrating input signals, to attain the specific predetermined value of zero by this third mathematical operation of effectively changing at least one of said input signals.

13. A measuring circuit according to claim 12, in which:

the means accomplishing said third mathematical operation of changing at least one of said signals at said first and second input means comprises a variable signal attenuator for proportionally reducing the larger of the two original input signals until its proportionally reduced stored value equals the stored value of the other smaller input signal.

14. A measuring circuit according to claim 13, in which:

said calibration memory means comprises means for storing that attenuator proportionality value which causes said larger input signal to be reduced to said smaller input signal;

whereby during subsequent computing operations the signal supplied to said attenuated input means will be corrected in the same proportional manner by the same value of said signal attenuator.

15. A measuring circuit according to claim 13, in which:

said signal attenuator comprises, at said larger signal input means, a chopping switch and means for supplying a repetitive, variable length "on" switching pulse to said chopping switch;

said chopping switch therefore being a variable duty cycle "on" switch, causing effective attenuation of said larger input signal by a percentage factor if its "on" duty time relative to a complete switch cycle.

16. A measuring circuit according to claim 15, in which:

said calibration memory means comprise a pair of continuously cycling memory signal generators, each generating a repetitive substantially identical signal;

said automatic recalibrating means comprising means for adjusting the relative phase of said pair of continuously cycling memory signal generators;

means for sensing the relative phase difference of said memory signal generators and for varying said length of said repetitive "on" switching pulses in accordance with said sensed phase difference;

whereby said automatic recalibrating means sets the phase difference of said continuously cycling memory signal generators, which phase difference subsequently determines the correcting attenuation during subsequent computing operations.

17. A measuring circuit according to claim 16, in which:

said pair of continuously cycling memory signal generators are operatively driven by a common oscillatory input signal;

whereby undesired relative phase slippages are avoided.

18. A measuring circuit according to claim 17, in which:

said pair of continuously cycling memory signal generators comprise digital recycling counters, driven by a high frequency pulse clock;

said relative phase difference sensing means comprises a flip-flop, the setting inputs of which are the output of the last stage of each said digital recycling counters, the output of said flip-flop therefore supplying the repetitive variable length "on" switching pulses to drive said chopping switch;

whereby said calibration memory means comprises pulse-driven digital counters, immune to possible unintended phase changes.